(12) United States Patent
Pan

(10) Patent No.: US 10,379,245 B2
(45) Date of Patent: Aug. 13, 2019

(54) METHOD AND SYSTEM FOR EFFICIENT EXTRAPOLATION OF A COMBINED SOURCE-AND-RECEIVER WAVEFIELD

(71) Applicant: PGS Geophysical AS, Oslo (NO)

(72) Inventor: Naide Pan, Sugarland, TX (US)

(73) Assignee: PGS Geophysical AS, Oslo (NO)

( * ) Notice: Subject to any disclaimer, the term of this patent is extended or adjusted under 35 U.S.C. 154(b) by 593 days.

(21) Appl. No.: 14/091,274

(22) Filed: Nov. 26, 2013

(65) Prior Publication Data

US 2015/0149093 A1    May 28, 2015
US 2018/0299573 A9    Oct. 18, 2018

Related U.S. Application Data

(60) Provisional application No. 61/842,593, filed on Jul. 3, 2013.

(51) Int. Cl.
*G01V 1/32* (2006.01)
*G01V 1/28* (2006.01)

(52) U.S. Cl.
CPC .............. *G01V 1/325* (2013.01); *G01V 1/28* (2013.01); *G01V 2210/1293* (2013.01); *G01V 2210/1423* (2013.01); *G01V 2210/57* (2013.01)

(58) Field of Classification Search
CPC ............ G01V 1/28; G01V 2210/1423; G01V 2210/57; G01V 2210/1293
See application file for complete search history.

(56) References Cited

U.S. PATENT DOCUMENTS

| 5,051,961 | A  | * | 9/1991 | Corrigan | G01V 1/364 367/24 |
| 6,430,510 | B1 | * | 8/2002 | Thomas | G01V 1/28 702/14 |
| 6,687,617 | B2 |   | 2/2004 | Kelly | |
| 7,035,737 | B2 |   | 4/2006 | Ren | |
| 7,039,525 | B2 |   | 5/2006 | Mittet | |
| 7,039,526 | B2 |   | 5/2006 | Kelly | |
| 2003/0055567 | A1 | * | 3/2003 | Kelly | G01V 1/28 702/14 |
| 2003/0200031 | A1 | * | 10/2003 | Kok | G01V 1/364 702/17 |

(Continued)

OTHER PUBLICATIONS

Claerbout, Jon F., "Toward a unified theory of reflector mapping", Geophysics, vol. 36, No. 3, Jun. 1971, pp. 467-481.

(Continued)

*Primary Examiner* — Mohammad K Islam

(57) ABSTRACT

The current document is directed to computational systems and methods carried out by the computational systems for propagating a combined source-and-receiver wavefield from a first level to a next, second level with respect to depth, time, or another dimension. The methods and systems, to which the current document is directed, apply an efficient complex, combined-source-and-receiver-wavefield propagation operator to a complex combined-source-and-receiver wavefield in order to propagate the complex combined-source-and-receiver wavefield to the next level. Real source and receiver wavefields at the next, second level can then be extracted from the complex combined-source-and-receiver wavefield at the next level.

21 Claims, 21 Drawing Sheets

(56) References Cited

U.S. PATENT DOCUMENTS

| | | | | |
|---|---|---|---|---|
| 2004/0044715 A1* | 3/2004 | Aldroubi | | G06T 5/001 708/490 |
| 2005/0090987 A1* | 4/2005 | Amundsen | | G01V 1/284 702/14 |
| 2007/0233437 A1* | 10/2007 | Manen | | G01V 1/28 703/2 |
| 2007/0265785 A1* | 11/2007 | Robertsson | | G01V 1/364 702/14 |
| 2010/0088035 A1* | 4/2010 | Etgen | | G01V 1/30 702/16 |
| 2011/0110190 A1* | 5/2011 | Thomson | | G01V 1/303 367/38 |
| 2012/0051176 A1* | 3/2012 | Liu | | G01V 1/28 367/38 |
| 2012/0065891 A1* | 3/2012 | Ikelle | | G01V 1/28 702/17 |
| 2012/0075954 A1* | 3/2012 | Xu | | G01V 1/303 367/38 |
| 2012/0243372 A1* | 9/2012 | Al-Dossary | | G01V 1/28 367/43 |
| 2012/0316850 A1* | 12/2012 | Liu | | G01V 1/28 703/6 |
| 2013/0003500 A1* | 1/2013 | Neelamani | | G01V 1/28 367/73 |
| 2013/0107665 A1* | 5/2013 | Fletcher | | G01V 1/36 367/43 |
| 2013/0128693 A1* | 5/2013 | Geiser | | G01V 1/288 367/27 |
| 2013/0182535 A1* | 7/2013 | Hung | | G01V 1/364 367/24 |
| 2013/0322208 A1* | 12/2013 | Sollner | | G01V 1/325 367/24 |
| 2013/0338922 A1* | 12/2013 | Yarman | | G01V 1/30 702/6 |
| 2013/0343154 A1* | 12/2013 | Zhang | | G01V 1/36 367/24 |
| 2014/0140174 A1* | 5/2014 | Lu | | G06F 12/08 367/73 |
| 2015/0046093 A1* | 2/2015 | Pires De Vasconcelos | | G01V 1/307 702/16 |
| 2015/0212222 A1* | 7/2015 | Poole | | G01V 1/36 702/14 |
| 2015/0316683 A1* | 11/2015 | Purves | | G01V 1/30 703/2 |
| 2016/0187513 A1* | 6/2016 | Poole | | G01V 1/362 702/16 |

OTHER PUBLICATIONS

Lehtinen, Jaakko, "Time-domain Numerical Solution of the Wave Equation", Feb. 6, 2003, pp. 1-17.

Claerbout, Jon F., "Fundamentals of Geophysical Data Processing", Blackwell Scientific Publications, 1985, pp. 1-75.

Etgen, John, et al., "An overview of depth imaging in exploration geophysics", Geophysics, vol. 74, No. 6, Nov.-Dec. 2009, pp. WCA5-WCA16.

* cited by examiner

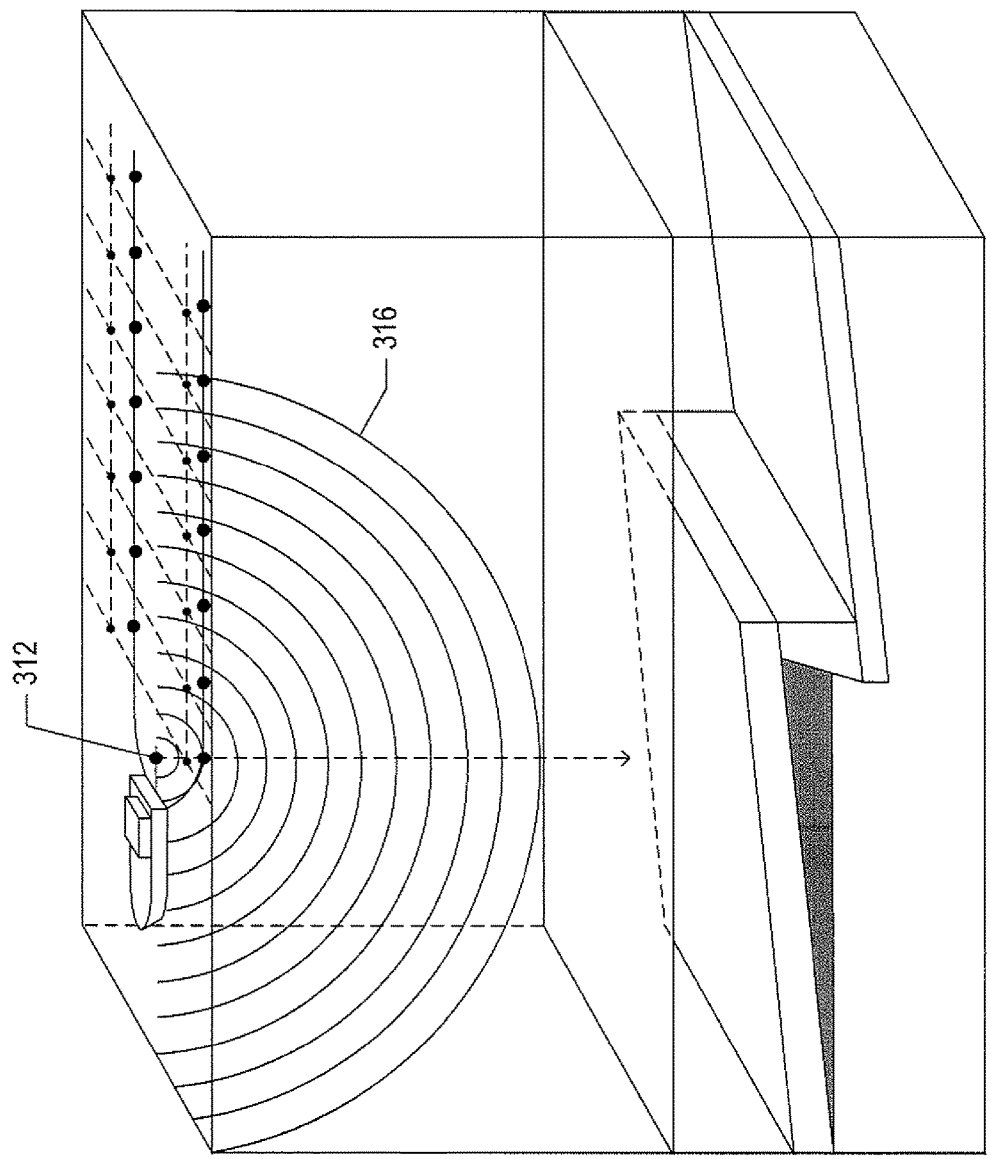

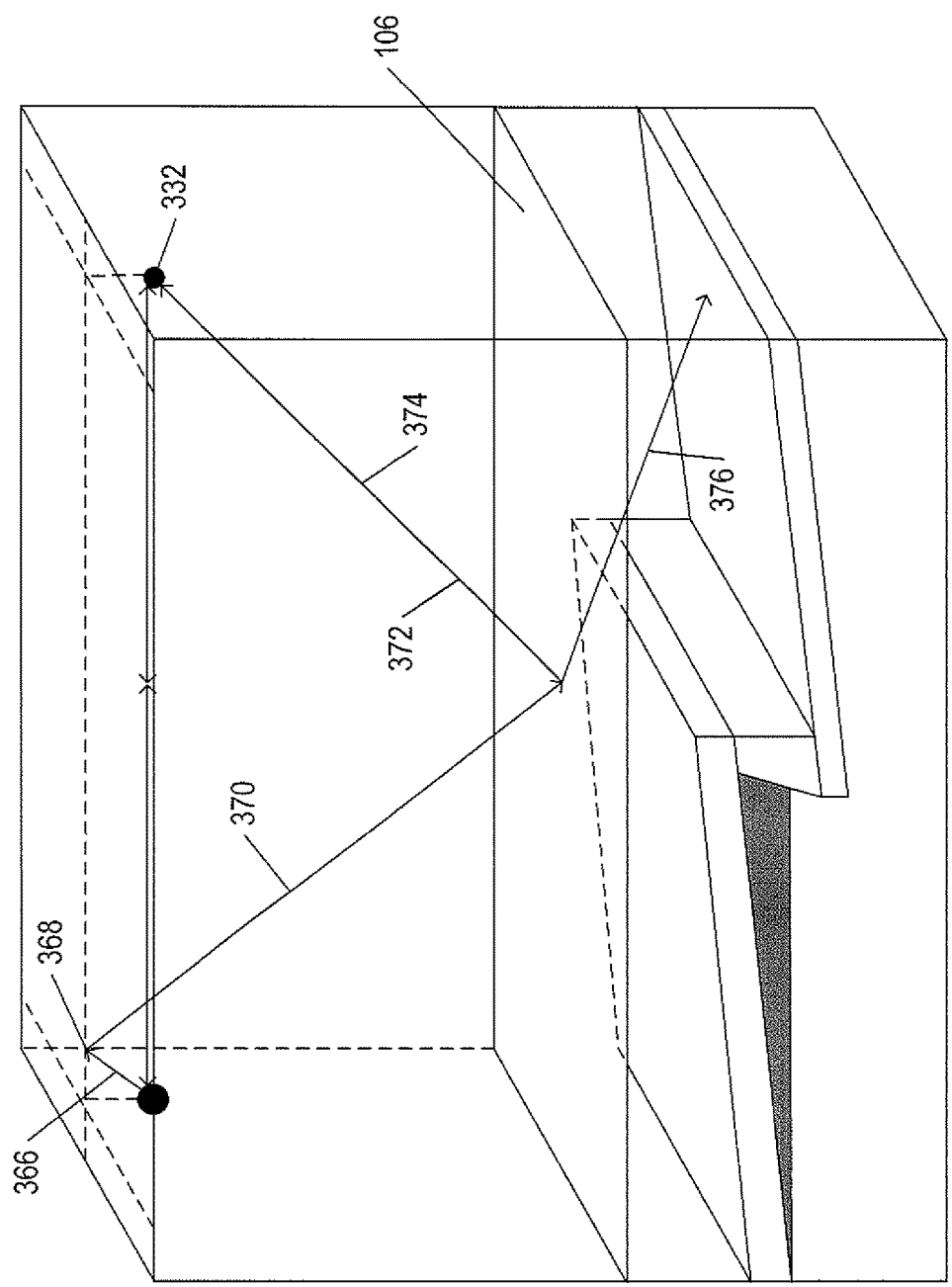

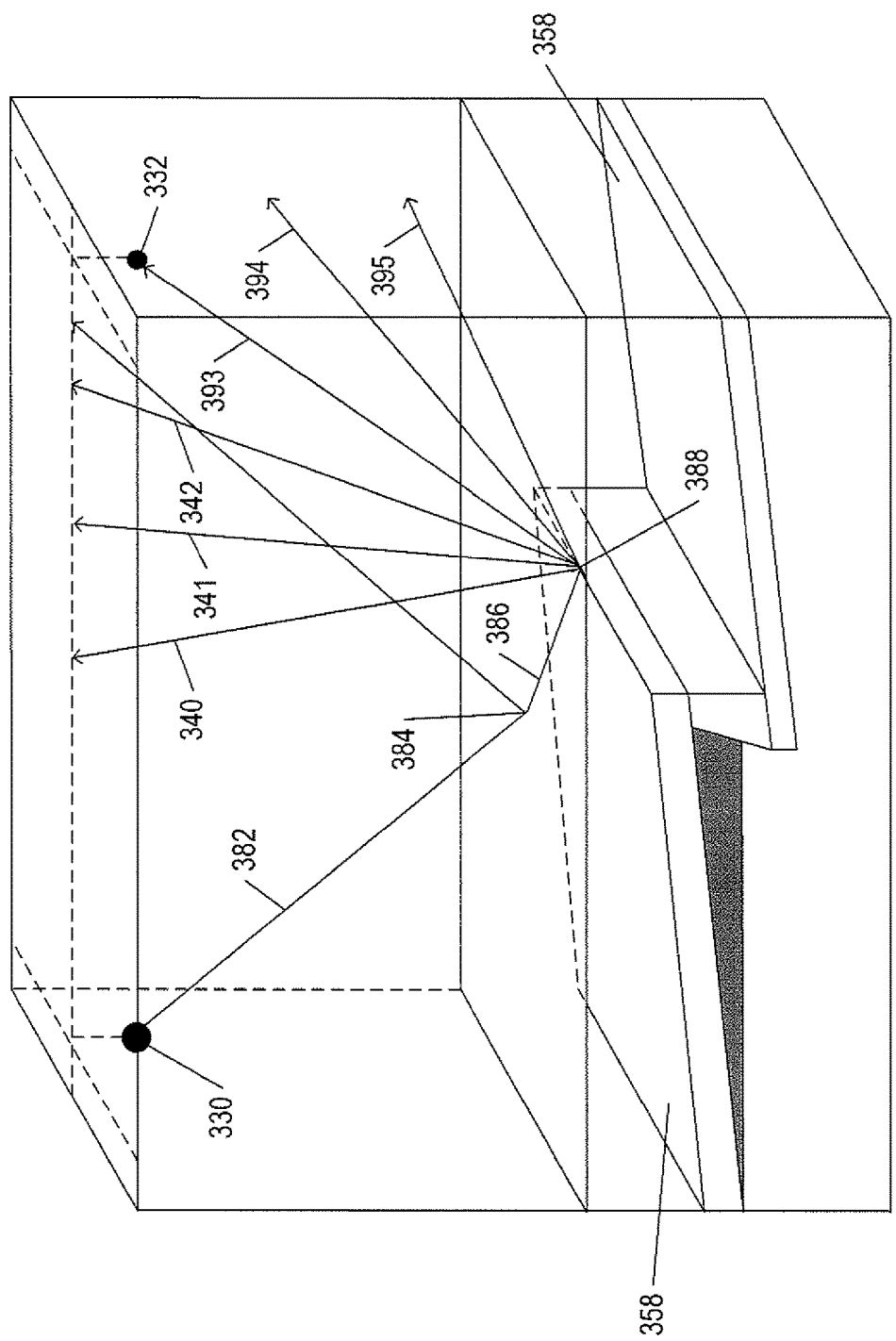

METHOD AND SYSTEM FOR EFFICIENT EXTRAPOLATION OF A COMBINED SOURCE-AND-RECEIVER WAVEFIELD

This application claims priority to U.S. Provisional Patent Application No. 61/842,593, filed on Jul. 3, 2013, which is hereby incorporated by reference in its entirety.

BACKGROUND

The field of exploration seismology, also known as geophysical surveying, is a relatively new and developing field of science and technology. Exploration seismology seeks to characterize the structure and distribution of materials below the earth's surface by processing seismic waves transmitted into the subsurface and reflected back from subsurface features. Imaging of subsurface features by analysis of seismic waves involves collecting relatively vast amounts of data that sample a time-dependent pressure wavefield and applying computational methods to solve for initially unknown boundary conditions that, together with the acoustic and/or elastic partial-differential wave equations and initial values, specify the time-dependent pressure wavefield.

Despite a steady increase in the computational processing power and the electronic data-storage capacities of modern computer systems, seismic-exploration data analysis has continued to be constrained by processing and data-storage costs and by the bandwidths and capacities of modern computer systems, even when advanced distributed supercomputer systems are employed. As a result, researchers, developers, and practitioners of seismic-exploration-related analytical methods continue to seek computationally efficient approaches to processing of the vast amounts of digitally encoded data collected during seismic-exploration operations which can, in turn, facilitate more cost-effective use of experimental equipment and more accurate subsurface-feature characterizations.

BRIEF DESCRIPTION OF THE DRAWINGS

FIGS. 3A-C illustrate a seismic-exploration method by which digitally encoded data is instrumentally acquired for subsequent seismic-exploration data processing and analysis in order to characterize the structures and distributions of features and materials underlying the solid surface of the earth.

FIG. 3E illustrates another type of phenomena that may occur within a domain volume following emission of an acoustic signal from an acoustic source.

FIG. 3G illustrates yet another type of phenomena that may occur following emission of an acoustic signal from an acoustic source.

DETAILED DESCRIPTION

The current document is directed to data processing systems and methods applicable to marine geophysical surveys, and, in some embodiments, to systems and methods for propagating a data representation of a combined source-and-receiver wavefield from a first level to a next, second level with respect to depth, time, or another dimension. The methods and systems, to which the current document is directed, apply an efficient complex, combined-source-and-receiver-wavefield propagation operator to a complex combined-source-and-receiver wavefield in order to propagate the complex combined-source-and-receiver wavefield to the next level. Real source and receiver wavefields at the next, second level can then be extracted from the complex combined-source-and-receiver wavefield at the next level.

Figure 1:
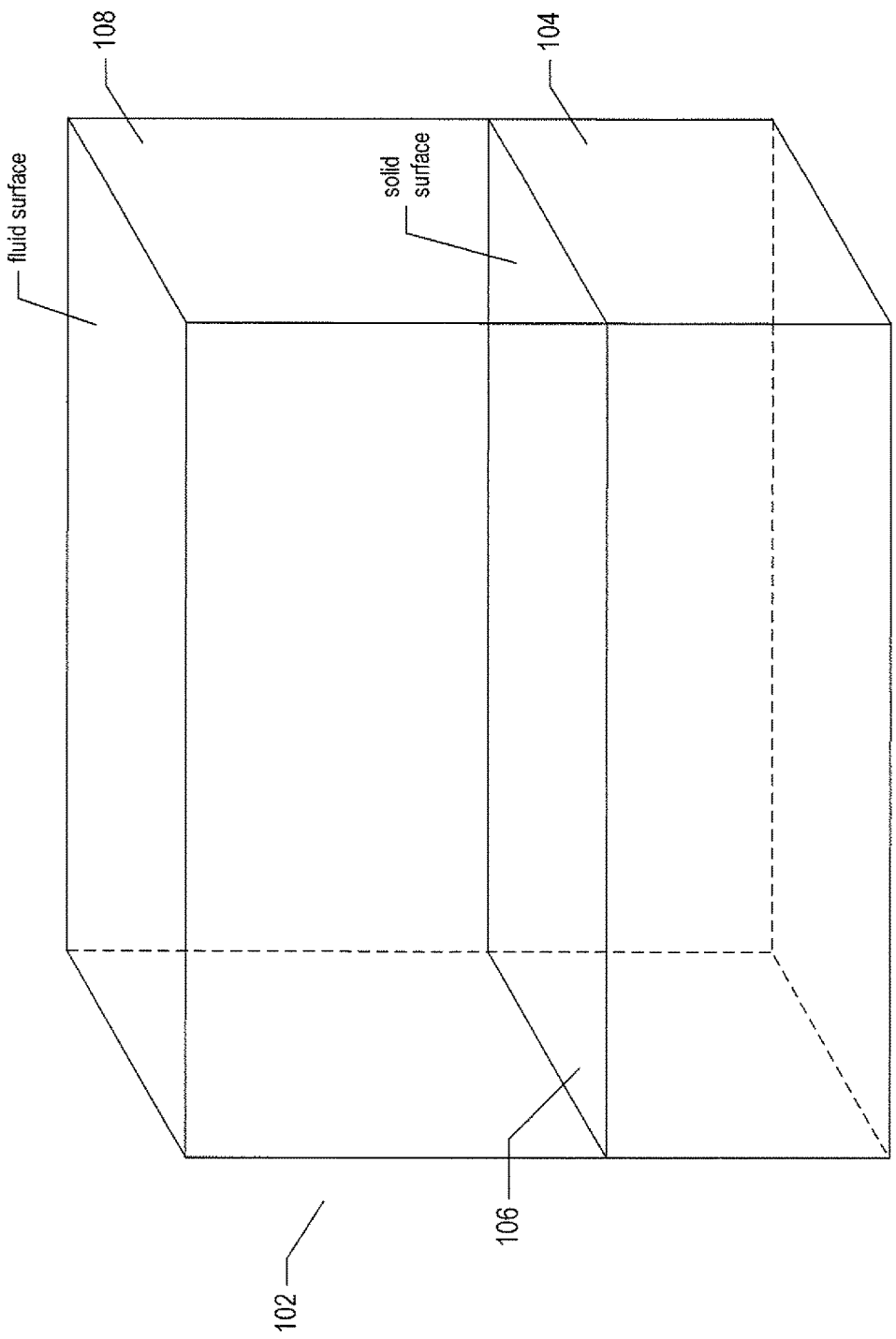
FIG. 1 illustrates a domain volume of the earth's surface.

FIG. 1 illustrates a domain volume of the earth's surface. The domain volume 102 comprises volume of sediment and rock 104 below the surface 106 of the earth that, in turn, underlies a fluid volume 108 within the ocean, an inlet or bay, a large freshwater lake, or other marine environment. The domain volume shown in FIG. 1 represents an example operational domain for a class of seismic-exploration observational and analytical techniques and systems referred to as "marine exploration seismology."

Figure 2:
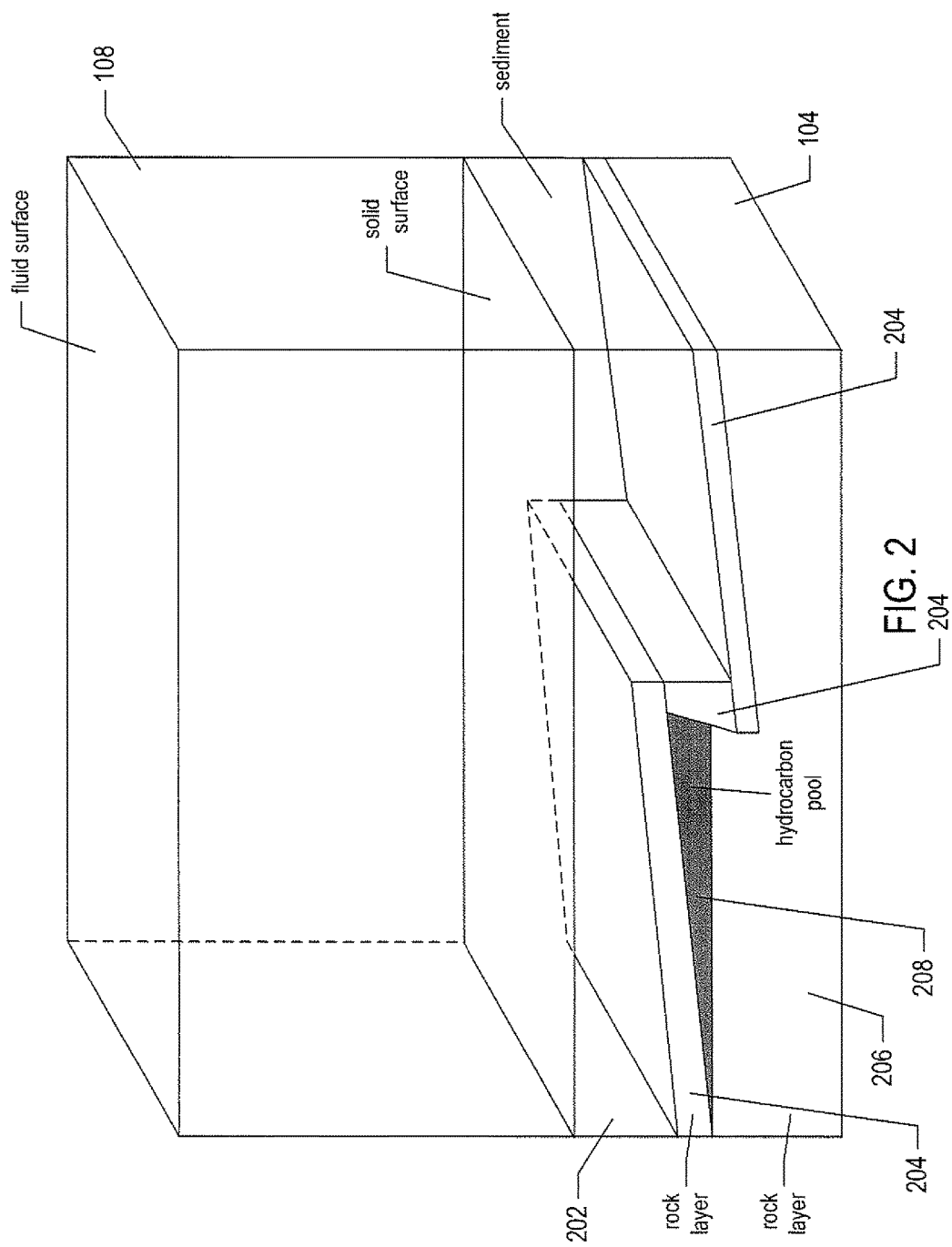
FIG. 2 illustrates subsurface features in the lower portion of the domain volume illustrated in FIG. 1.

FIG. 2 illustrates subsurface features in the lower portion of the domain volume illustrated in FIG. 1. As shown in FIG. 2, for seismic-exploration purposes, the fluid volume 108 is a relatively featureless, generally homogeneous volume overlying the solid volume 104 of interest. However, while the fluid volume can be explored, analyzed, and characterized with relative precision using many different types of methods and probes, including remote-sensing submersibles, sonar, and other such devices and methods, the volume of solid crust 104 underlying the fluid volume is comparatively far more difficult to probe and characterize. Unlike the overlying fluid volume, the solid volume is significantly heterogeneous and anisotropic, and includes many different types of features and materials of interest to exploration seismologists. For example, as shown in FIG. 2, the solid volume 104 may include a first sediment layer 202, a first fractured and uplifted rock layer 204, and a second, underlying rock layer 206 below the first rock layer. In certain cases, the second rock layer 206 may be porous and contain a significant concentration of liquid hydrocarbon in a hydrocarbon-saturated layer 208 that is less dense than the second-rock-layer material, and that therefore rises upward within the second rock layer. In the case shown in FIG. 2, the first rock layer is not porous, and therefore forms a lid that prevents further upward migration of the liquid hydrocarbon, which therefore pools in a hydrocarbon-saturated layer 208 below the first rock layer 204. One goal of exploration seismology is to predict the locations of hydrocarbon-saturated porous strata within volumes of the earth's crust underlying the solid surface of the earth.

Figure 3A:
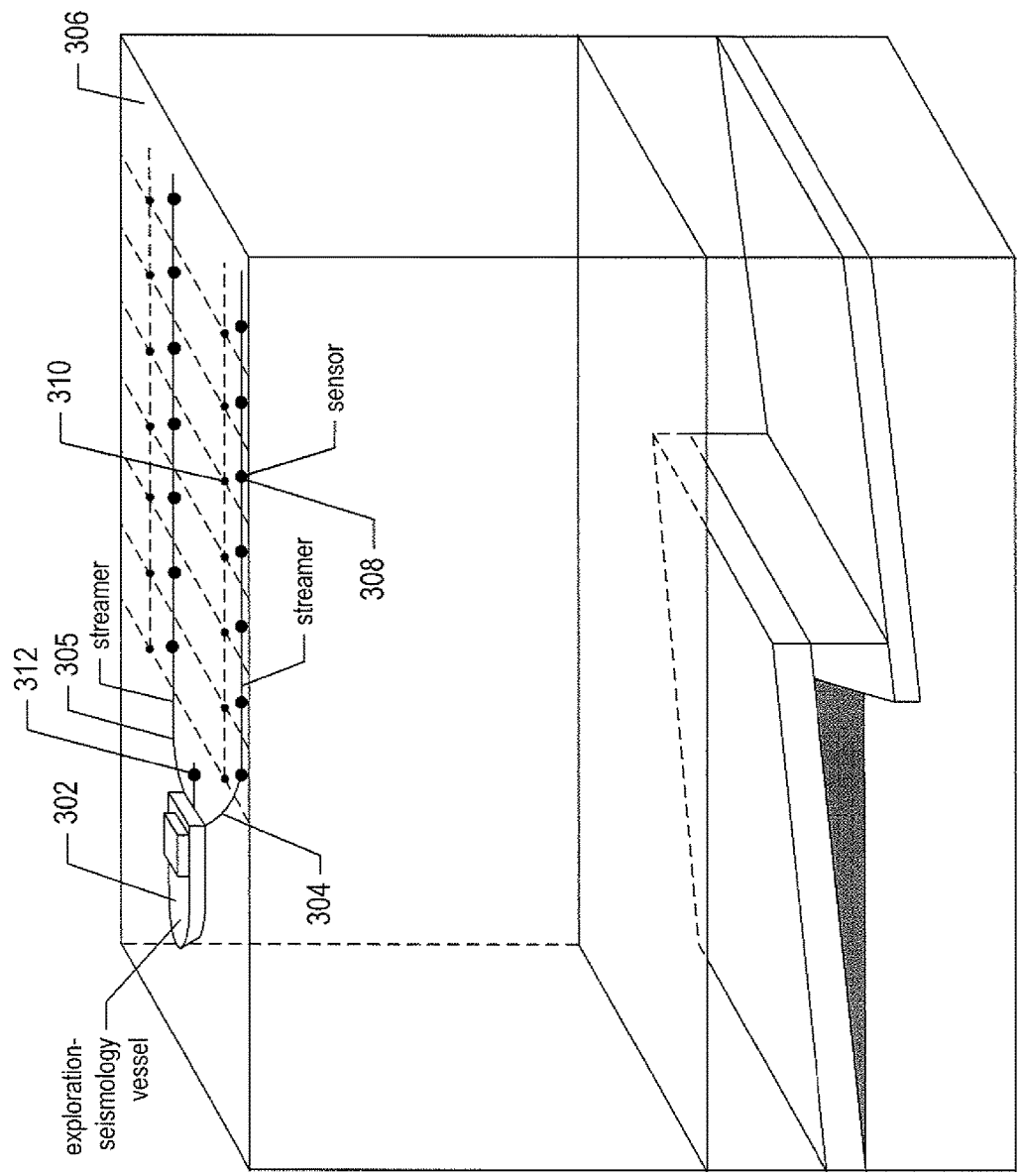
Figure 3C:
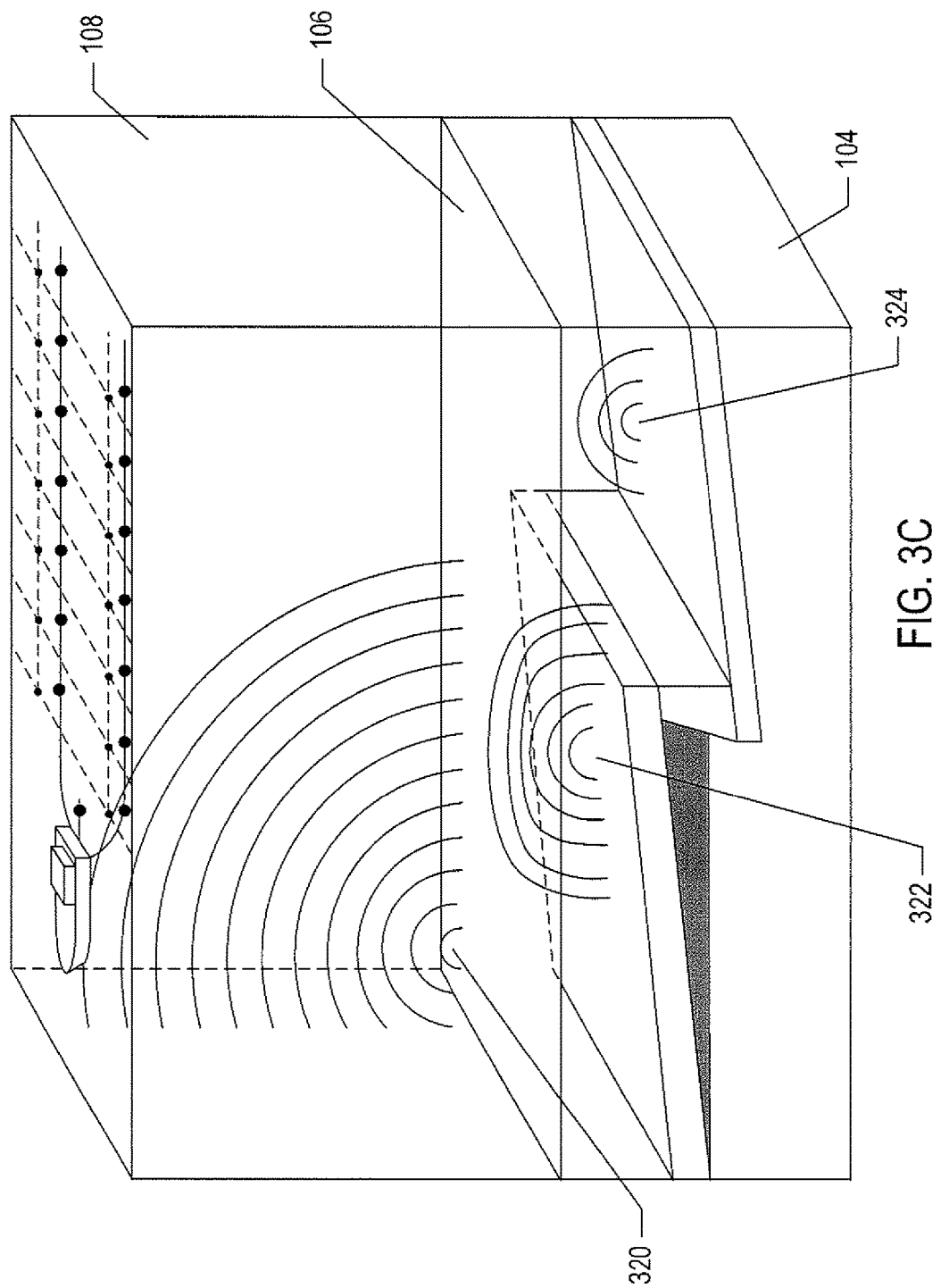

FIGS. 3A-C illustrate a seismic-exploration method by which digitally encoded data is instrumentally acquired for subsequent seismic-exploration data processing and analysis in order to characterize the structures and distributions of features and materials underlying the solid surface of the earth. As shown in FIG. 3A, a seismic-exploration vessel 302 is configured to carry out a continuous series of seismic-exploration operations and data collections. The seismic-exploration vessel 302 tows one or more streamers 304-305 across an approximately constant-depth plane generally located between five meters and a few tens of meters below the fluid surface 306. The streamers are long cables containing power and data-transmission lines to which sensors, such as the sensor represented by the shaded disk 308 in FIG. 3A, are connected at regular intervals. In one type of exploration seismology, each sensor, such as sensor 308 in FIG. 3A, comprises a pair of seismic sensors including a geophone, which detects particle displacement within the fluid medium over time by detecting particle velocities or accelerations, and a hydrophone, which detects variations in pressure over time. The streamers and seismic-exploration vessel include sophisticated sensing electronics and data-processing facilities that allow sensor readings to be correlated with absolute horizontal positions on the fluid surface and absolute three-dimensional positions with respect to an arbitrary three-dimensional coordinate system. In FIG. 3A, the sensors along the streamers are shown to lie below the fluid surface, with the sensor positions correlated with overlying surface positions, such as surface position 310 correlated with the position of sensor 308. The seismic-exploration vessel 302 also tows one or more acoustic-wave sources 312 that produce acoustic signals at regular spatial and temporal intervals as the seismic-exploration vessel 302 and towed streamers 304-305 move forward (in the towing direction) across the fluid surface 306.

FIG. 3B illustrates an expanding, spherical acoustic wavefront, represented by semicircles of increasing radius centered at the acoustic source 312, such as semicircle 316, following an acoustic signal emitted by the acoustic source 312. The wavefronts are, in effect, shown in vertical cross section in FIG. 3B. As shown in FIG. 3C, the outward and downward expanding acoustic wavefront, shown in FIG. 3B, eventually reaches the solid surface 106, at which point the outward and downward expanding acoustic waves partially reflect from the solid surface and partially refract downward into the solid volume, becoming elastic waves within the solid volume. In other words, in the fluid volume, the waves are compressional pressure waves, or P-waves, propagation of which can be modeled by the acoustic-wave equation while, in a solid volume, the waves include both P-waves and transverse S-waves, the propagation of which can be modeled by the elastic-wave equation. Within the solid volume, at each interface between different types of materials or at discontinuities in density or in one or more of various other physical characteristics or parameters, downward propagating waves are partially reflected and partially refracted, as at solid surface 106. As a result, each point of the solid surface and within the underlying solid volume 104 becomes a potential secondary point source from which acoustic and elastic waves, respectively, may emanate.

As shown in FIG. 3C, secondary waves of significant amplitude are generally emitted from points on or close to the solid surface 106, such as point 320, and from points on or very close to a discontinuity in the solid volume, such as points 322 and 324. Tertiary waves may be emitted from the fluid surface back towards the solid surface in response to secondary waves emitted from the solid surface and subsurface features. In many seismic-exploration analyses, the complicated wavefield formed by the superpositions of all of the secondary, tertiary, and higher-order waves emitted in response to the initial acoustic wave, both in the fluid medium and the solid medium, are modeled as acoustic waves as an often reasonable approximation to the more accurate, but far more mathematically and computationally complicated acoustic-wave-and-elastic-wave superposition model.

FIG. 3C also illustrates the fact that secondary waves are generally emitted at different times within a range of times following the initial acoustic signal. A point on the solid surface, such as point 320, receives a pressure disturbance corresponding to the initial acoustic signal more quickly than a point within the solid volume, such as points 322 and 324. Similarly, a point on the solid surface directly underlying the acoustic source receives the pressure signal sooner than a more distant-lying point on the solid surface. Thus, the times at which secondary and higher-order waves are emitted from various points within the solid volume are related to the distance, in three-dimensional space, of the points from the acoustic source.

Acoustic and elastic waves, however, travel at different velocities within different materials as well as within the same material under different pressures. Therefore, the travel times of the initial acoustic signal and secondary waves emitted in response to the initial acoustic signal are complicated functions of distance from the acoustic source as well as the materials and physical characteristics of the materials through which the acoustic wave corresponding to the initial acoustic signal travels. In addition, as shown in FIG. 3C for the secondary wave emitted from point 322, the shapes of the expanding wavefronts may be altered as the wavefronts cross interfaces and as the velocity of sound varies in the media traversed by the wave. The superposition waves emitted from within the domain volume 102 in response to the initial acoustic signal is a generally very complicated wavefield that includes information about the shapes, sizes, and material characteristics of the domain volume 102, including information about the shapes, sizes, and locations of the various reflecting features within the solid volume of interest to exploration seismologists.

Figure 3D:
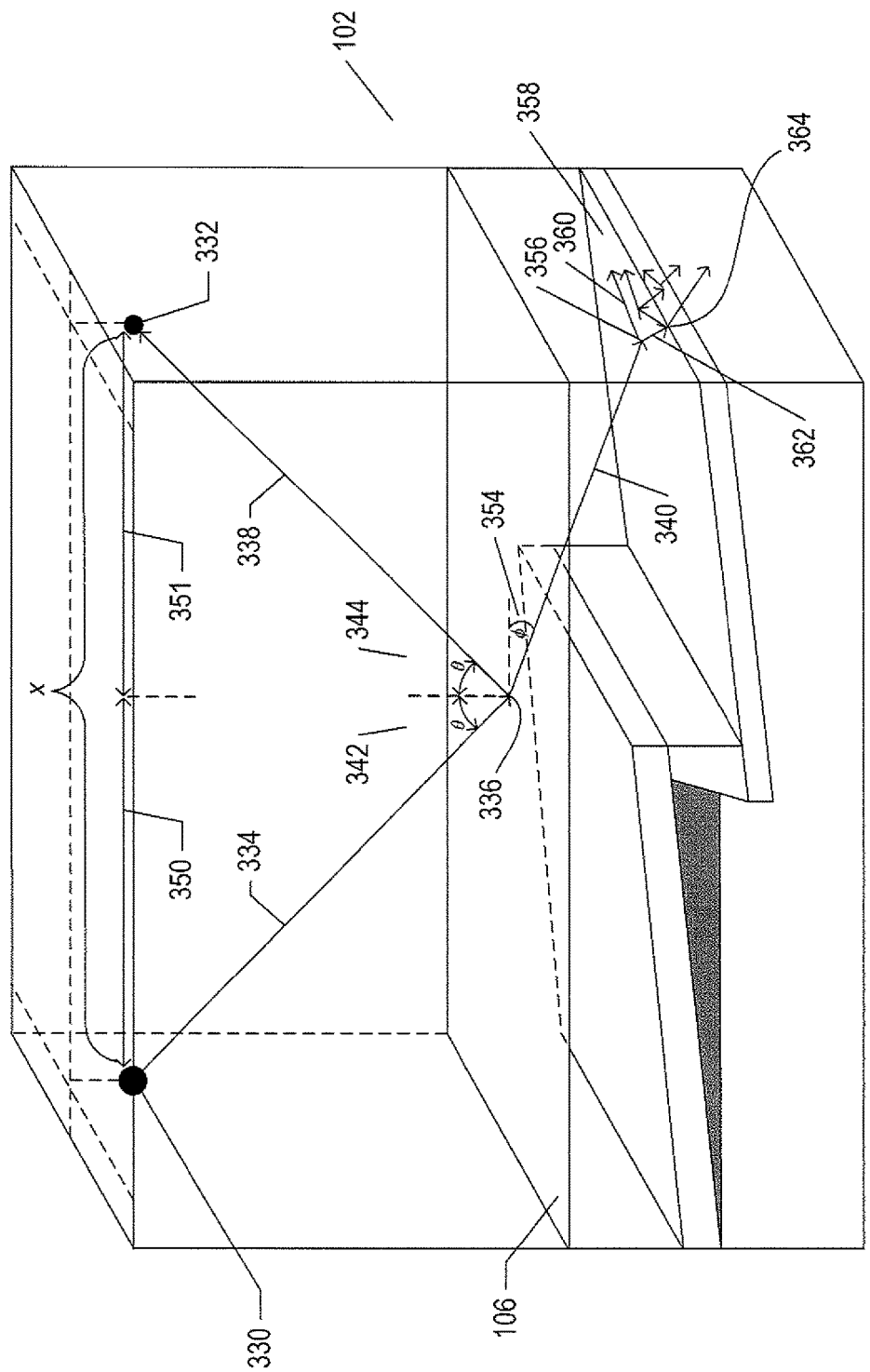
FIG. 3D illustrates, using ray tracing, various types of events that may occur subsequent to activation of an acoustic signal.

Another way to view the various types of phenomena that contribute to the pressure and/or velocity measurements made by receivers during a seismic-exploration operation is by simple ray tracing of acoustic waves from the acoustic source or acoustic sources to the receivers. Ray tracing can provide an intuitive illustration of the various different types of phenomena, but suffers the deficiency that ray tracing provides a vastly oversimplified picture of the complicated acoustic wave forms that arise from acoustic-source-generated acoustic signals. FIG. 3D illustrates, using ray tracing, various types of events that may occur subsequent to activation of an acoustic signal. In FIG. 3D, and in FIGS. 3E-G discussed below, an acoustic source 330 and an acoustic receiver 332 are shown within a portion of a domain volume 102 separated by a distance x. Rays, essentially arrows, such as directional arrow 334, are used to illustrate the propagation of a spherical or distorted-spherical acoustic wave in a particular direction. The rays are normal to the wavefronts at the points where they intersect the wavefronts. One of the reasons that ray-tracing illustrations tend to vastly oversimplify the actual waveforms that arise in domain volumes is that a given wavefront is associated with an infinite number of rays, in the mathematical sense, but only one or a few of the infinite number of rays are generally shown in order to illustrate a particular phenomenon.

In FIG. 3D, an acoustic signal generated from the acoustic source 330 propagates in the direction of ray 334 and impinges on the solid surface 106 at point 336. Because the fluid medium, above this surface, and the solid medium, below the surface, have very different properties with respect to sound velocity, a portion of the impinging wave is reflected upward from the point, as represented by ray 338 and a portion of the impinging ray 334 is transmitted into the solid medium, as represented by ray 340. The relative amplitudes of the reflected and transmitted portion of the impinging ray 334 is a complicated function of various properties of the liquid and solid media that interface at solid surface 106. According to Snell's Law, the angle of incidence 342 of ray 334 with respect to solid surface 106 and the reflection angle 344 are equal. The travel time of the signal from the source to the receiver along rays 334 and 338, representing reflection of the signal from the solid surface, is therefore longer than the travel time of a direct pressure wave from the source 330 to the receive 332 along line segments 350-351, since the reflection path is longer and both paths traverse the same medium. For a direct pressure wave from source 330 to receiver 332, the time of arrival at the distance x is:

$$t(x) = \frac{x}{v},$$

where x is horizontal offset of the receiver from source; and
v is velocity of sound in the medium.
However, for the signal reflected from the solid surface in the path represented by rays 334 and 338, the time for the signal to reach the receiver, at offset x, is:

$$t(x) = \frac{1}{v}\sqrt{x^2 + 4z^2},$$

where z is vertical distance to reflective interface.
Thus, the travel time of the signal can be used to compute the depth z of the horizontal surface 106. Furthermore, the amplitude of the reflected acoustic signal with respect to the source-signal amplitude is a function of various parameters of the medium through which the signal travels. Values for unknown parameters of subterranean media can be discerned from analysis of the amplitudes of reflected acoustic signals. The portion of ray 334 that is transmitted into the solid medium, represented by ray 340, has an angle with the interface 354 that is generally smaller than the incidence angle, according to Snell's Law, since the speed of an acoustic wave in solid media is generally much higher than the speed of an acoustic wave in fluid. The transmitted portion of incident ray 334, represented by ray 340, ultimately impinges on a second point 356 of a second solid surface 358 and is again partially reflected, as represented by ray 360 and partially transmitted, as represented by ray 362. A secondary-transmission ray impinges on a third solid surface at point 364, and is again partially reflected and partially transmitted, and these secondary reflections and transmissions may, in turn, generate additional reflections and transmissions. Thus, a single ray emitted from the acoustic source 330 can generate a multitude of descending and ascending rays within the domain volume.

FIG. 3E illustrates another type of phenomena that may occur within a domain volume following emission of an acoustic signal from an acoustic source. A portion of the wavefront, emitted in the direction of ray 366, impinges on a point on the water surface 368 and is almost entirely reflected back into the fluid medium, as represented by ray 370. This ray then impinges on point 372 on solid surface 106 and is both reflected, as represented by ray 374, and transmitted, as represented by ray 376. The reflected ray impinges on receiver 332. In this case, the travel time of the signal to the receiver, by way of an initial reflection from the water surface, is clearly longer than the travel time for a direct reflection, illustrated in FIG. 3D by rays 334 and 338, since the path length for the water-surface-reflected rays 368, 370, and 374 is longer than the path length for the direct reflection represented by rays 334 and 338. Furthermore, the additional reflection reverses the phase of the water-surface-reflected signal versus the directly reflected signal. Because the difference in path lengths is relatively small, the time offset of the signal arriving at the receiver via direct reflection versus initial reflection from the water's surface is very small, and is often referred to as a "ghost reflection."

Figure 3F:
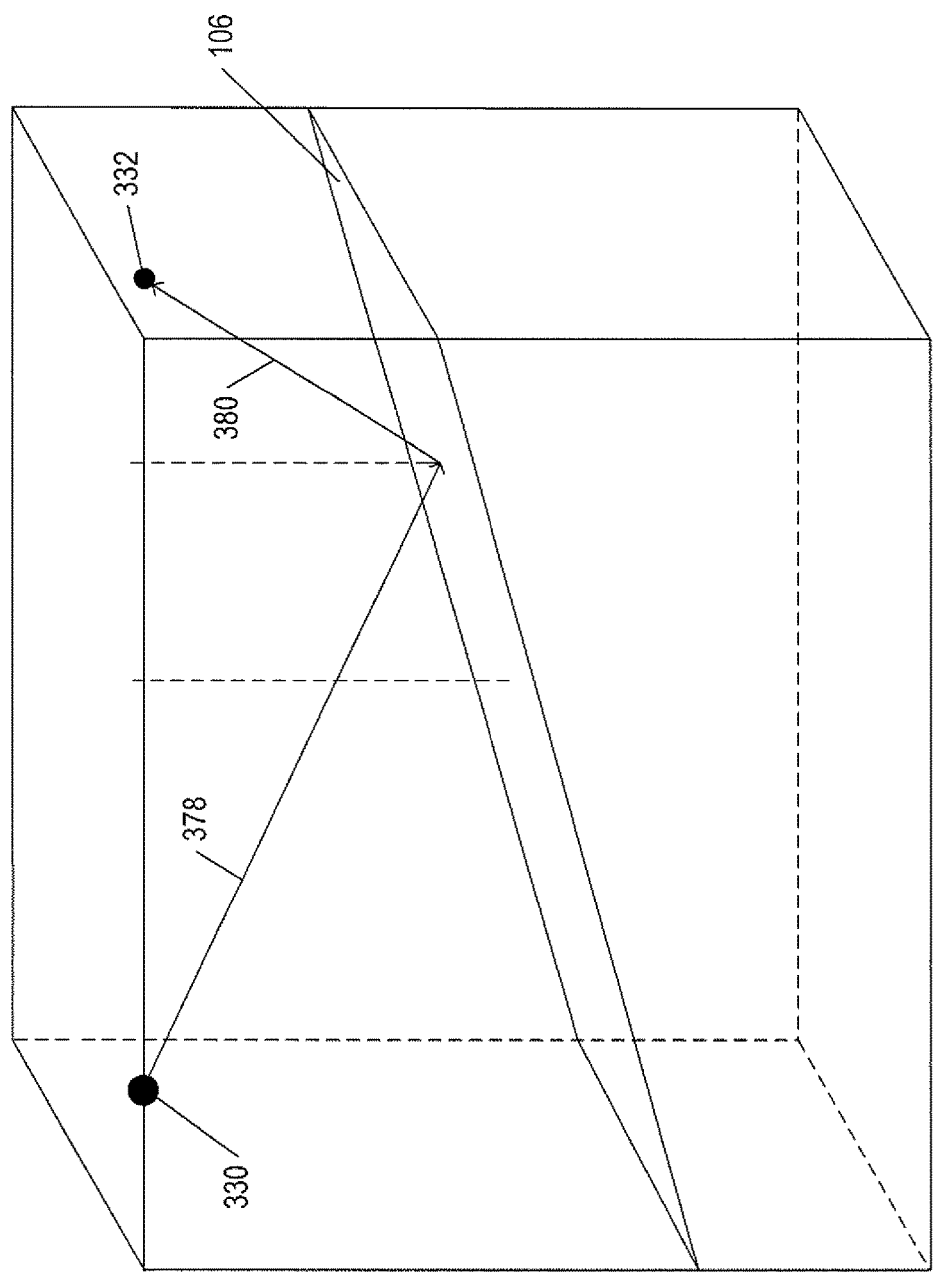
FIG. 3F shows reflection from a non-horizontal subsurface level.

FIG. 3F shows reflection from a non-horizontal subsurface level. As shown in FIG. 3F, when the solid surface 106 is not horizontal, the travel time of the signal from the source 330 to the receiver 332, represented by rays 378 and 380, is generally different than the travel time for direct reflection from a horizontal surface. In the case of a non-horizontal surface, the travel time is:

$$t(x) = \frac{1}{v}\sqrt{x^2 + 4z^2 - 4xz\sin\theta\cos\phi}$$

where θ is the angle of reflective surface to horizontal in the direction of the line between source and receiver; and
φ is the angle of reflective surface to horizontal in a direction perpendicular to line between source and receiver.

Thus, travel times of signals can also be used to compute angles of the solid surface with respect to a horizontal solid surface.

FIG. 3G illustrates yet another type of phenomena that may occur following emission of an acoustic signal from an acoustic source. As shown in FIG. 3G, an emitted acoustic wave, represented by ray 382 impinges on the solid surface at point 384 and is partially transmitted, as represented by ray 386, to a point 388 at the edge of a lower, fractured solid surface 358. Points near discontinuities, such as the edge of the fractured surface, may diffract an impinging acoustic wave in various different directions. In FIG. 3G, rays 390-395 represented diffracted acoustic waves from point 388. Thus, receiver 332 receives a diffracted signal via the ray path 382, 386, and 393. The geometries for diffracted rays are different from those for directly reflected rays, with the different observed in the computed travel times for diffracted acoustic waves as compared to reflected acoustic waves. The detection of diffracted acoustic waves can assist in recognizing discontinuities in the subterranean environment.

When one considers all of the different possible events, a few of which are illustrated in FIGS. 3D-G, for spherical acoustic waves emitted from an acoustic source and a domain volume, the resulting 3-dimensional, time-dependent acoustic waveform that arises within the domain volume is staggeringly complicated. Many additional phenomena contribute to the complexity of the waveform, including medium-dependent attenuation of acoustic signals, destructive and constructive interference of the initial acoustic signal and the vast number of secondary, tertiary, and higher-order reflected and transmitted signals, and the complicated geometries and compositions of the subterranean environment.

Figure 4A:
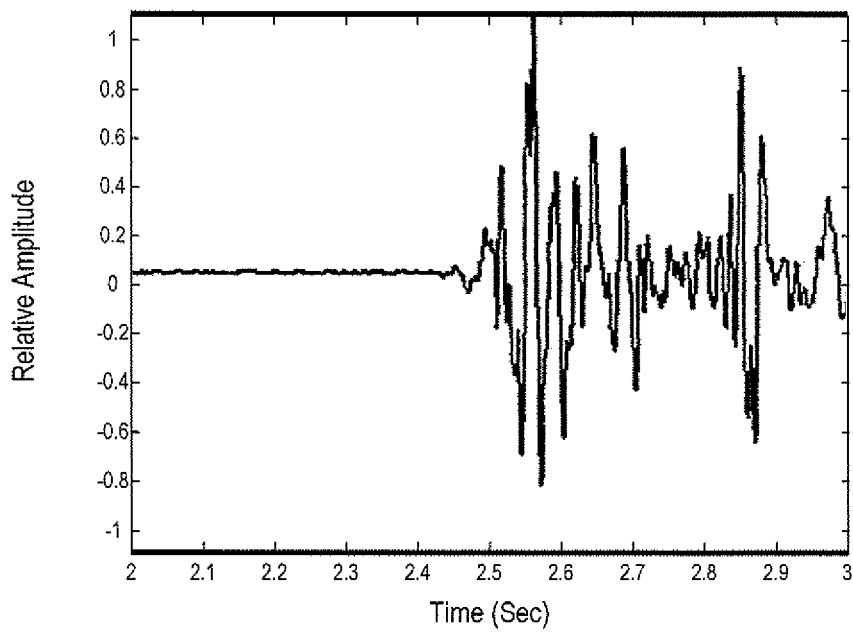
FIGS. 4A-C illustrate processed waveforms generated from hydrophone and geophone outputs.
Figure 4B:
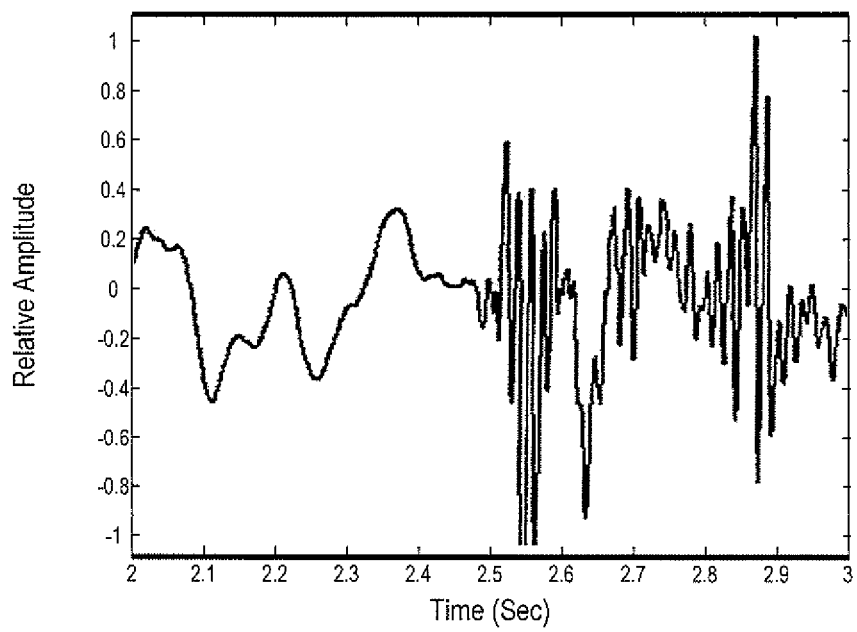
Figure 4C:
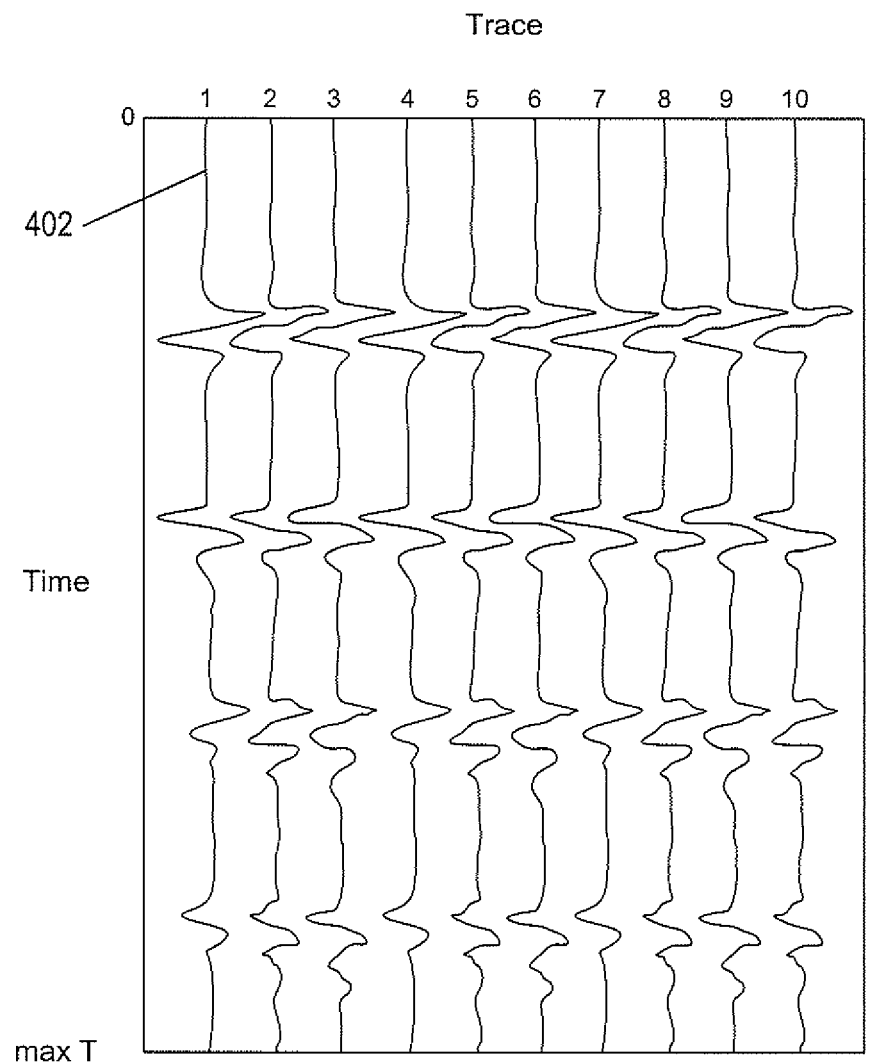

The complicated wavefield that ensues in response to the initial acoustic signal is sampled, over time, by sensors positioned along the streamers towed by the seismic-exploration vessel. FIGS. 4A-C illustrate processed waveforms generated from hydrophone and geophone outputs. As shown in FIG. 4A, the waveform recorded by the hydrophone represents the pressure at times following the initial acoustic signal, with the amplitude of the waveform at a point in time related to the pressure at the hydrophone at the point in time. Similarly, as shown in FIG. 4B, the geophone provides an indication of the fluid velocity or acceleration with respect to time.

FIG. 4C illustrates data collected from ten different receivers during a seismic-exploration operation. The signal generated by each receiver is shown as a generally vertical line, such as the signal 402 in FIG. 4C, that represents the receiver reading, in time, from time 0, at the top of the figure, to some maximum time at the bottom of the figure. The signal generated by each receiver is referred to as a trace. Thus, trace 402 represents the signal generated by receiver 1. The raw data is generally processed in order to normalize and align the traces. This normalization may involve non-linear expansions and contractions along the time dimension. It is important to note that, in data processing for exploration seismology, very large amounts of data are collected and processed in order to obtain as high a resolution sample as possible of the acoustic waveform within a domain volume.

Because the seismic-exploration vessel is continuously moving, the initial, processed hydrophone and geophone data is first correlated with absolute position and corrected for various characteristics of the instrument response within the dynamic operational spatial geometry to produce an initial $z_0$ sampling of the complicated pressure wavefield recorded by the sensors and seismic-exploration vessel following an acoustic signal. In other words, the result of an seismic-exploration operation and data collection, where the operation consists of a single acoustic signal generated by the acoustic source and recording of the sensor output, at millisecond intervals over three to five seconds beginning at a point in time following the initial acoustic signal, is a series of two-dimensional samplings of the complicated wavefield at an initial depth z0 corresponding to, or corrected from, the sensor depth. Each two-dimensional sampling corresponds to a different point in time.

Figure 5A:
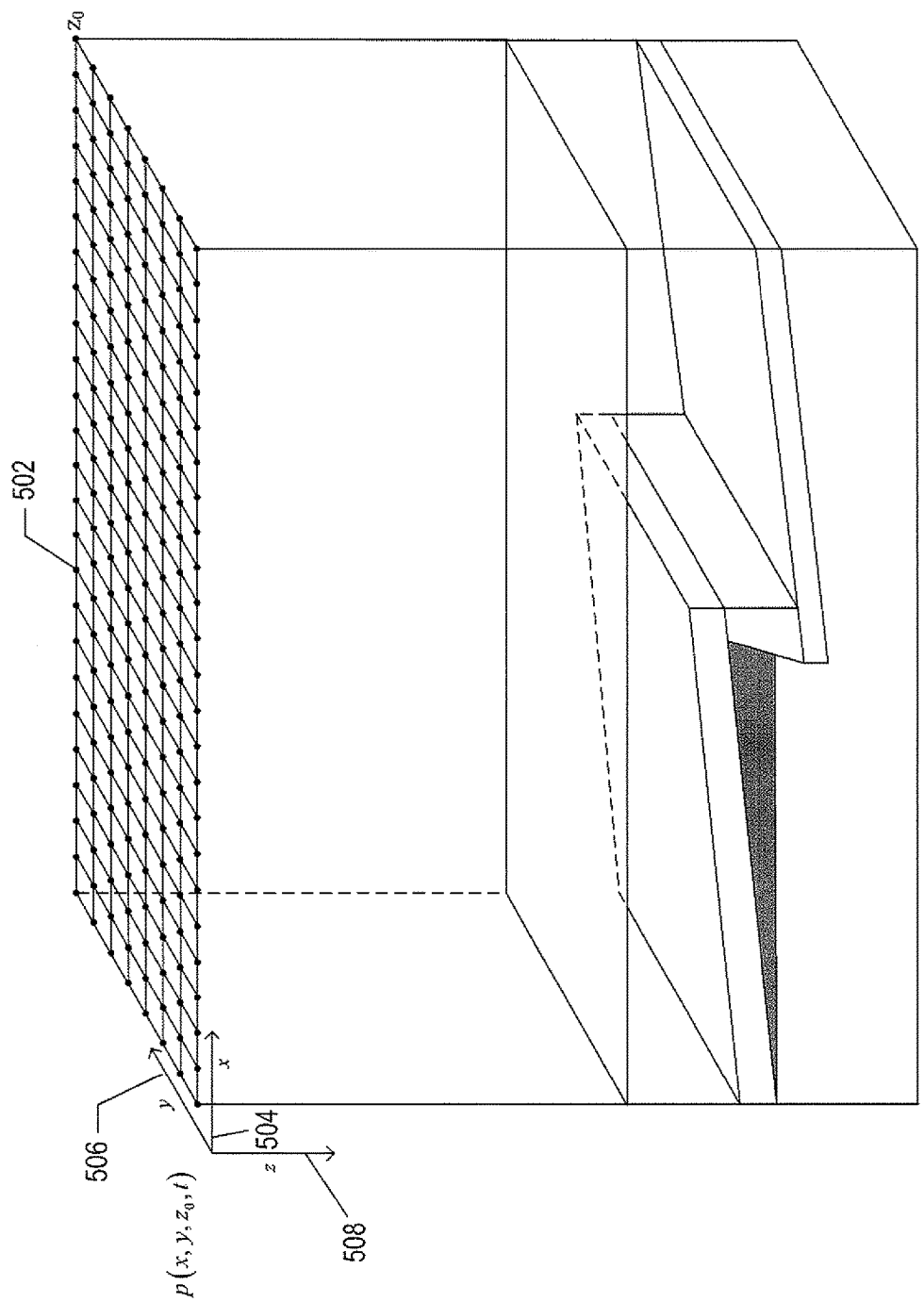
FIGS. 5A-D illustrate three-dimensional pressure-wavefield extrapolation.

In a next phase of seismic-exploration analysis, a three-dimensional sampling of the complicated pressure wavefield is extrapolated from each two-dimensional sampling. FIGS. 5A-D illustrate three-dimensional pressure-wavefield extrapolation. FIG. 5A shows a single two-dimensional sampling of the pressure wavefield at a single point in time generated from the observed data following various initial dynamic-geometry, sensor-position, and sensor-response-related corrections. The full, three-dimensional pressure wavefield can be viewed as a function:

$$p(x,y,z,t)$$

that maps a real-number scalar pressure value, or relative pressure differential, to each point in the domain volume represented by spatial coordinates (x,y,z) with respect to time t within a time domain. A constant-depth slice of the three-dimensional pressure wavefield at depth $z_0$ can be represented as:

$$p(x,y,z_0,t).$$

However, there is no closed-form mathematical representation for either the complicated three-dimensional or constant-depth wavefields. Instead, the data generated from the initial sensor-output recordings is a discrete sampling of the pressure or a pressure differential with respect to a reference pressure at the $z_0$ depth across the domain volume. In FIG. 5A, a grid-like two-dimensional coordinate system is superimposed on the $z_0$ plane, with each sample point represented by a small filled disk, such as disk 502. For many purposes, a rectangular Cartesian coordinate system is used, with the x axis 504 aligned with the streamer axes and the seismic-exploration-vessel path (304 and 305 in FIG. 3A) and the y axis 506 orthogonal to the streamer direction. The z axis 508 corresponds to depth, with z values increasing with increasing downward distance from the $z_0$ position. Thus, $p(x,y,z_0,t)$ is a vector or matrix of real-number values stored in one or more non-transitory data-storage devices within a computer system.

Figure 5B:
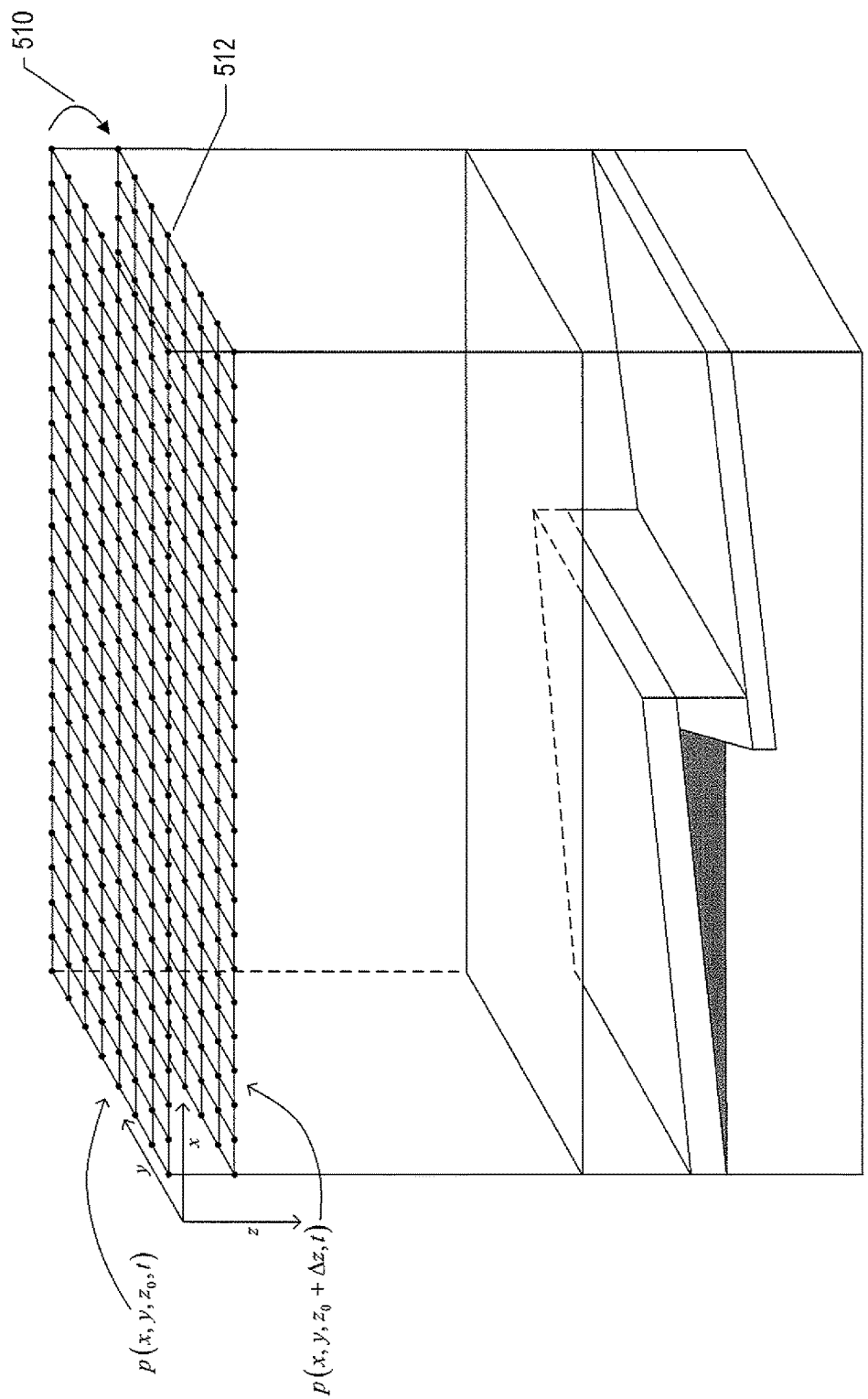

As shown in FIG. 5B, a computational wavefield-extrapolation process can be used to generate an extrapolated sampling at a next depth $z_1$. This computational process is represented in FIG. 5B by curved arrow 510, and the result of the computational process is an extrapolated sampling of the pressure wavefield at depth $z_1$, represented in FIG. 5B by the second, lower two-dimensional coordinate grid with sample points 512. Thus, while the sampling of the $z_0$ constant-depth wavefield $p(x,y,z_0,t)$, shown in FIG. 5A, is obtained by initial processing and correction of the observed data, the sampling of the pressure wavefield at depth $p(x,y,z_1,t)$, is generated computationally from $p(x,y,z_0,t)$. The computational process represented by curved arrow 510 in FIG. 5B and by numerous curved arrows shown in FIG. 5C, discussed below, is an example of extrapolation that can be efficiently carried out using the methods to which the current document is directed.

Figure 5C:
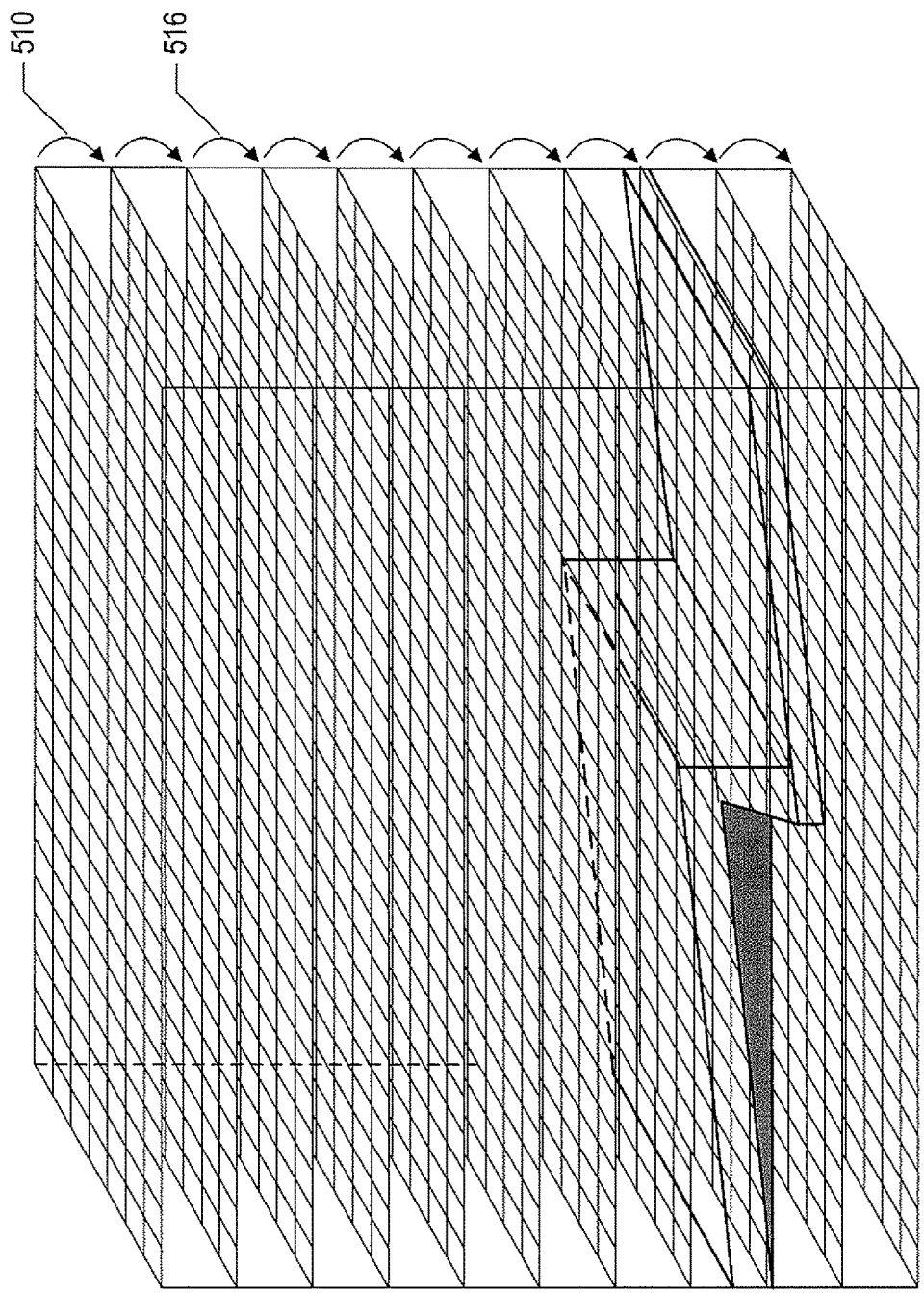
Figure 5D:
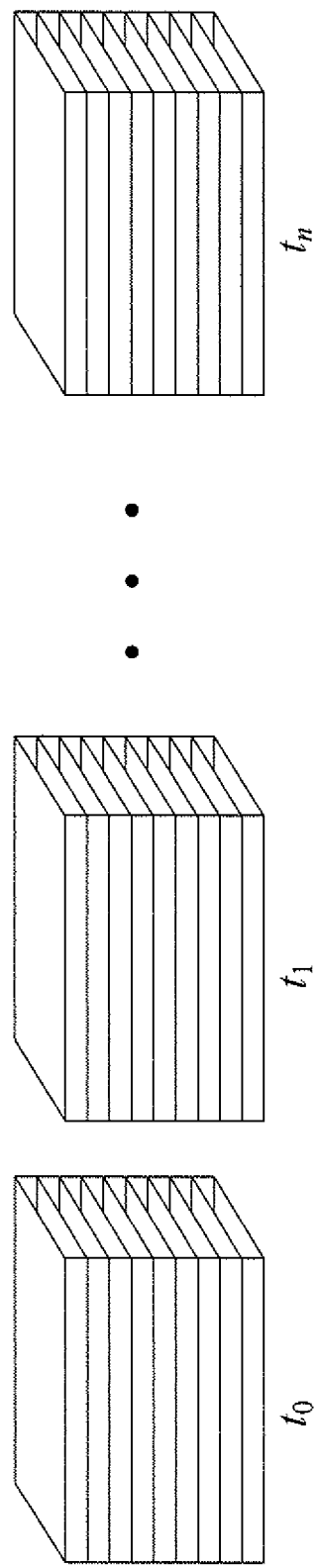

As shown in FIG. 5C, the two-dimensional pressure-wavefield sampling extrapolation can be successively applied to produce an extrapolated three-dimensional wavefield for a sub-volume of the domain volume or for the entire domain volume. Each curved arrow, such as curved arrow 516 in FIG. 5C, represents application of the wavefield-extrapolation computational process that extends the sampled three-dimensional wavefield to a next-lowest depth interval. Thus, from each two-dimensional sampling at depth $z_0$ at different points in time, a full three-dimensional wavefield sampling over the domain volume is generated for the different points in time by wavefield extrapolation. As shown in FIG. 5D, a series of three-dimensional wavefield extrapolations therefore represents a sampling of the full time-dependent pressure wavefield $p(x,y,z,t)$ over both spatial and temporal domains. Note that the spacings and relative scales of the domain volume, seismic-exploration vessel, streamers, sensors, and depth intervals at which two-dimensional samplings are generated in FIGS. 1-5D are not meant to accurately portray actual spacings and relative scales. Instead, FIGS. 1-5D are intended to illustrate certain general concepts related to seismic-exploration operation and data-processing.

Note also that, in many seismic-exploration data-processing systems and methods, constant-time sampling slices are generally not produced during data processing and analysis. The above discussion and illustration of the three-dimensional time-dependent pressure wavefield p(x,y,z,t) are intended to illustrate the nature of the discrete three-dimensional time-dependent pressure wavefield, rather than to illustrate the data-processing steps and mathematical models employed to transform raw sensor signals collected during operations into discrete representations of continuous pressure wavefields.

One mathematical model for the acoustic wavefield is a second-order partial differential equation, referred to as the "acoustic-wave equation," two forms of which are provided below:

$$\frac{\partial^2 p}{\partial t^2} = \rho(x, y, z) v^2(x, y, z)$$

$$\left[ \frac{\partial}{\partial x} \frac{1}{\rho(x, y, z)} \frac{\partial p}{\partial x} + \frac{\partial}{\partial y} \frac{1}{\rho(x, y, z)} \frac{\partial p}{\partial y} + \frac{\partial}{\partial z} \frac{1}{\rho(x, y, z)} \frac{\partial p}{\partial z} \right],$$

$$= \rho v^2 \nabla \cdot \frac{1}{\rho} \nabla p,$$

where p=p(x,y,z,t)=pressure;
 t=time;
 x,y,z=special coordinates;
 v=velocity of medium at (x,y,z);
 ρ(x,y,z)=density of medium at (x,y,z); and
 ∇=the del operator.

This partial differential equation relates the time behavior of the pressure wavefield to the spatial structure of the pressure wavefield, and can be derived from Newton's second law and Hooke's law. The acoustic-wave equation corresponds to many different possible pressure wavefields p(x,y,z,t). In general, partial differential equations are solved with respect to certain specified initial values and boundary conditions in order to select a specific pressure wavefield corresponding to the partial differential equation. For example, in the above-described seismic-exploration operation, initial values include the location and magnitude of the initial acoustic signal and the boundary conditions include the shapes, sizes, locations, and characteristics of the various reflective interfaces, including the solid surface (106 in FIG. 1), the depth of the solid surface below the fluid surface, and the shapes, sizes, and locations of the subsurface features, including interfaces between rock layers. As noted above, the observed and extrapolated pressure wavefield p(x,y,z,t) is not a mathematical expression, but is instead stored data.

In many cases a second, more complicated partial differential equation is used to model the more complicated elastic waves that propagate within solid media underlying the solid surface (106 in FIG. 1). Elastic waves include longitudinal and transverse components, with greater mathematical complexity and more complicated dependencies on the parameters and characteristics of the media through which elastic waves propagate. Due to the increase complexities, many types of seismic-exploration data analyses employ only an acoustic-wave model, even for wave propagation through solid media.

Figure 6A:
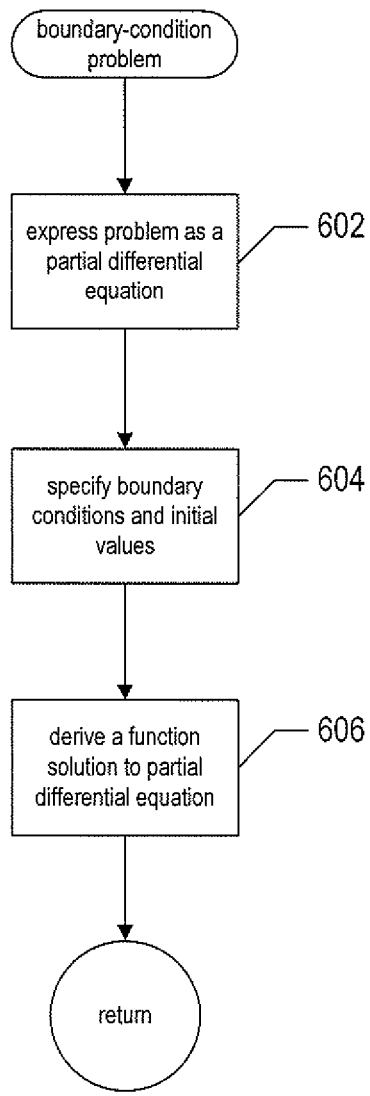
FIG. 6A shows a flow diagram for solving a normal partial-differential equation boundary-condition problem.

FIG. 6A shows a flow diagram for solving a normal partial-differential equation boundary-condition problem. In a first step 602, the problem is expressed or represented as a partial differential equation, such as the above-provided acoustic-wave partial differential equation. Next, the various initial values and boundary conditions for a specific problem are specified mathematically. Finally, a specific solution of the partial differential equation is derived with respect to the specified boundary conditions and initial values. As an example, by providing a full characterization of the domain volume, as shown in FIG. 2, as well as the time, location, and magnitude of the initial acoustic signal, the acoustic-wave partial differential equation can be numerically solved to produce the pressure wavefield p(x,y,z,t). However, as discussed above, in seismic-exploration analysis, the data obtained during a seismic-exploration operation provide an extrapolated, sampled pressure wavefield p(x,y,z,t), while various boundary conditions, including the structure and distribution of subsurface features, are not known. Therefore, at a high level, seismic-exploration data analysis constitutes a type of inverse boundary-condition problem which is solved to determine certain of the boundary conditions that were not known when the seismic-exploration operation was conducted.

Figure 6B:
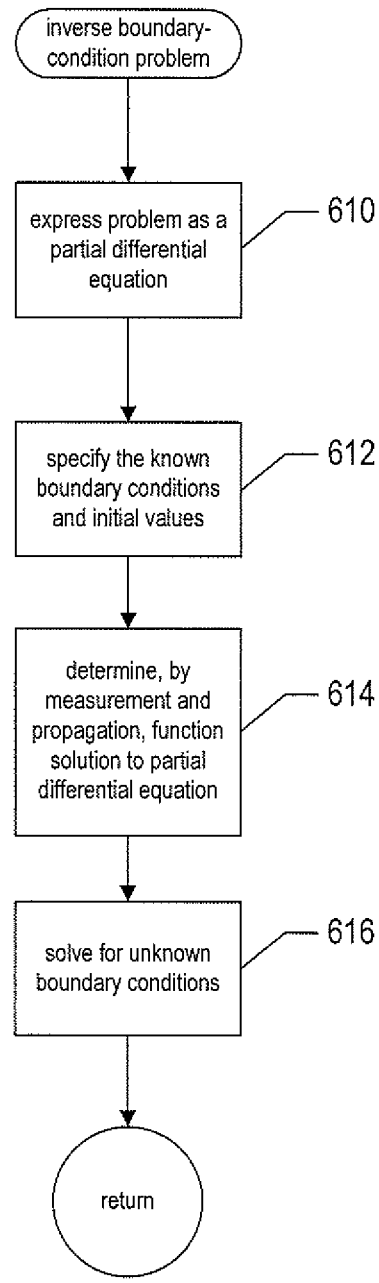
FIG. 6B shows a flow diagram for solving an inverse boundary-condition problem.

FIG. 6B shows a flow diagram for solving an inverse boundary-condition problem. In step 610, the problem is expressed as a partial differential equation, as in step 602 of FIG. 6A. Next, in step 612, those boundary conditions that can be specified as well as the initial values are mathematically specified. In step 614, a discrete pressure wavefield or other specific discrete solution to the partial differential equation is constructed from operational observation and, in the seismic-exploration context, computational wavefield extrapolation. Finally, in step 616, those boundary conditions that were not known and specified in step 612 are solved for from the observed data, partial differential equation, and specified known boundary conditions and initial values. Thus, the general seismic-exploration analysis constitutes an inverse boundary-condition-problem solution.

Note that, in the seismic-exploration analysis discussed above, the partial differential equations and solutions to partial differential equations are expressed discretely and computationally, rather than continuously and analytically. The pressure wavefield p(x,y,z,t) is computationally represented as a sampling of a real-valued scalar field. The sampling parameters vary with different types of sensors, streamer configurations, operational conditions, computational bandwidth, and data-storage and data-manipulation capacities of the computer systems employed to carry out the seismic-exploration analysis. In many cases, the x, y, and z sampling intervals range between 10 and 30 meters and the domain volume may have x, y, z dimensions of 5-10 kilometers, 5-10 kilometers, and 0.5-10 kilometers, respectively, and many thousands of extrapolation steps may be involved in generating a three-dimensional pressure wavefield for seismic-exploration applications. However, both the sampling intervals and domain-volume dimensions may vary considerably depending on operational equipment, methods, and conditions.

The pressure wavefield is most easily thought of as being represented in the space-time domain, as discussed above. In other words, the pressure wavefield can be viewed as a function of position in three-dimensional space, represented by the vector r, and time t:

$$p(r,t).$$

Alternatively, the pressure wavefield can be expressed or represented in a wave-vector, angular-frequency domain or, equivalently, a wavenumber-angular-frequency domain:

$$P(k,\omega).$$

The wave vector k has spatial components $k_x$, $k_y$, and $k_z$ and is normal to a wavefront and has a magnitude inversely proportional to wavelength of the wave producing the wavefront. The angular frequency ω is 2πν, where ν is the frequency of the wave in cycles per unit time.

Figure 7:
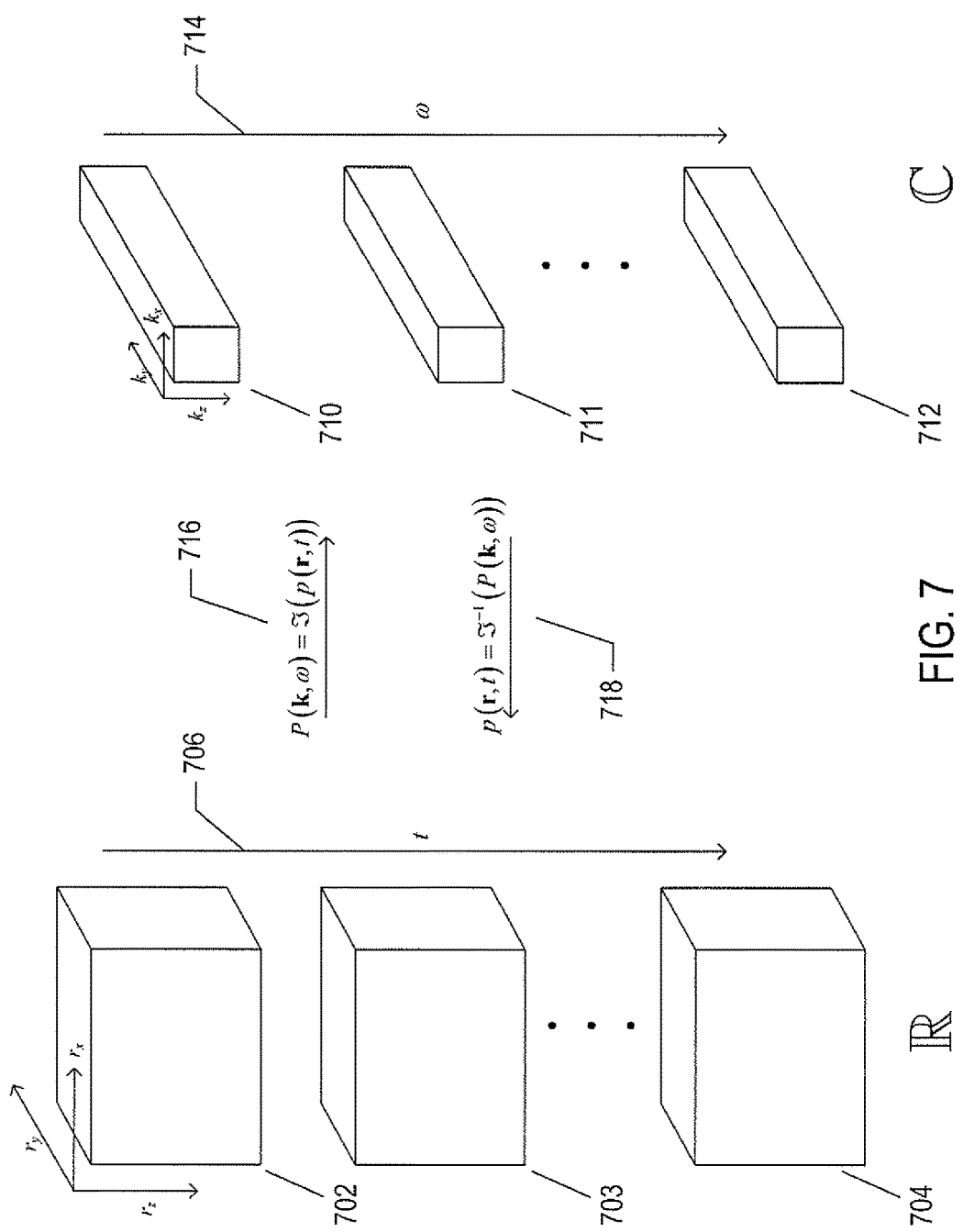
FIG. 7 illustrates two different representations of an acoustic wavefield.

FIG. 7 illustrates two different representations of an acoustic wavefield. The space-time representation, p(r,t), is represented in the left-hand side of FIG. 7 as a series of three-dimensional scalar pressure or pressure-differential fields 702-704 ordered along a time axis 706 while the wavenumber-angular-frequency representation of the wavefield is shown in the right-hand side of FIG. 7 as a series of three-dimensional wave-number representations of superimposed waves 710-712 ordered along an angular frequency axis 714. A point in a three-dimensional pressure scalar field, such as scalar field 702, represents the pressure or a pressure differential at a particular point in space. A particular plane wave with a particular direction and frequency would be represented in the space-time domain as periodically varying pressure within the entire three-dimensional volume. By contrast, a point in the three-dimensional wave-vector space 710 represents a particular plane wave. The plane wave is characterized by the wave vector as well as by the angular frequency of the plane wave. The space-time and wavenumber-angular-frequency representations of a pressure wavefield contain equivalent information. In general, a space-time representation is a scalar real number field over three spatial dimensions and one temporal dimension while the wavenumber-angular-frequency representation is a complex-number field, or vector field, over three wave-vector component dimensions and an angular frequency dimension. The wavenumber-angular-frequency representation of the pressure field is generated by a forward Fourier transform 716 of the space-time representation, and the space-time representation of the pressure wavefield is generated by an inverse Fourier transform of the wavenumber-angular-frequency 718. Expressions for the Fourier transforms are provided below:

$$p(r, t) = \left(\frac{1}{2\pi}\right)^3 \int_w \int_k P(k, \omega)e^{i(k \cdot r + \omega t)} dk\, d\omega,$$

$$P(k, \omega) = \int_t \int_r p(r, t)e^{-i(k \cdot r + \omega t)} dr\, dt,$$

where r=vector pointing to a point within x,y,z space;
t=time;
k=wave vector;
ω=angular frequency;
p(r,t)=pressure at point r at time t;
P(k,ω)=is related to amplitude of wave with wave vector k and angular frequency ω contributing to p(r,t).
Similarly, the pressure wavefield can also be expressed in a space-angular-frequency domain corresponding to forward and inverse Fourier transforms:

$$p(r, t) = \frac{1}{2\pi} \int_t P(r, \omega)e^{i\omega t} d\omega,$$

$$P(r, \omega) = \int_t p(r, t)e^{-i\omega t} dt.$$

The space-time, wavenumber-angular-frequency, and space-angular-frequency domains are examples of domains for various representations of acoustic wavefields. A variety of mathematical transforms can be used to transform the space-time representation of an acoustic wavefield to alternative representations, in addition to Fourier transforms. In general, a wavefield can be transformed from a first domain to a second domain by an appropriate first transform and can be transformed from the second domain to the first domain by a second inverse transform corresponding to the first transform. In the following, a space-time representation of a wavefield may be referred to, as an example, a "first-domain wavefield" and the corresponding wavenumber-angular-frequency representation may be referred to as a "second-domain wavefield."

Next, an example of a computational solution of the acoustic-wave equation is provided. In this solution, the second-order partial differential equation is transformed into a pair of ordinary differential equations and the solution is generated by propagating the pressure wave forward in time. This example is provided to illustrate computational, discrete methods for solving the acoustic-wave equation in a relatively simple, easily understood context. The example is taken from the article "Time-domain Numerical Solution of the Wave Equation" by Jaakko Lehtinen published on Feb. 6, 2003.

In the following, a time-dependent pressure field u(t,x) solution to the wave equation is determined, with x∈Ω, where Ω denotes the set of points inside the environment to be simulated and t>0. The solution u to the equation is a scalar function over the three spatial dimensions and time that assigns an acoustic sound pressure for each point x in the environment for each t.

For the following example wave-equation solution process, the wave equation can be expressed as:

$$\frac{\partial^2 u}{\partial t^2} = c^2 \nabla^2 u + f \qquad (1)$$

where c is the speed of sound, which is assumed to be constant. The equation thus relates the second time derivative of the pressure to its spatial Laplacian $\nabla^2 u$, with $f=f(t,x)$ representing time-dependent force terms. The force terms $f(t,x)$ represent sources of disturbances in pressure, or the sound sources. Usually, the wave equation is solved with $f$ describing an initial signal. The solution of the wave equation then describes the time-dependent propagation of the signal in the environment.

There is no unique solution for equation (1). However, when boundary conditions that represent how the boundaries of the environment reflect sound waves are specified as values of u(t,x) on the boundaries of the environment or as the values of the normal derivatives $\nabla u \cdot n$ of u(t,x) where the vectors n are the outward unit normal at boundary points, and, in addition, when various initial values are also specified, including an initial pressure distribution u(0,x) and an initial velocity distribution $$\frac{\partial u(0, x)}{\partial t},$$

a unique solution for equation (1) along with the specified boundary conditions and initial conditions may be determined.

Consider one-dimensional, continuous, bounded, real-valued functions defined on the interval [0,1]. In order to represent a general function, a large but finite number N of equidistant sample points xi, with i=1, . . . , N, may be selected within the interval and the values of the general function at the sample points may be computed and stored. The distance between two sample points is denoted by h. Consider calculation of the derivatives of the function which we have represented by function values at sample points. One class of methods is suggested by the difference quotient that is used to define the derivative in the continuous case. This yields the approximations $$f'(x_i) \approx \frac{f(x_{i+1}) - f(x_i)}{h}, \quad (2)$$

$$f'(x_i) \approx \frac{f(x_i) - f(x_{i-1})}{h}, \text{ and} \quad (3)$$

$$f'(x_i) \approx \frac{f(x_{i+1}) - f(x_{i-1})}{2h}, \quad (4)$$

which are called forward difference, backward difference and central difference, respectively.

A Taylor-series expansion provides an approximation for the second derivative:

$$f(x+h) = f(x) + \frac{h^1}{1!}f'(x) + \frac{h^2}{2!}f''(x) + \frac{h^3}{3!}f'''(x) + O(h^4), \quad (5)$$

$$f(x-h) = f(x) - \frac{h^1}{1!}f'(x) + \frac{h^2}{2!}f''(x) - \frac{h^3}{3!}f'''(x) + O(h^4), \quad (6)$$

$$f''(x) = \frac{f(x-h) - 2f(x) + f(x+h)}{h^2} + O(h^2). \quad (7)$$

By writing values of the function at the sample points of the function u as an N-dimensional vector $u_h$, the difference approximations can be written in a matrix form so that multiplication of the vector $u_h$ of function values with the matrix produces a new vector approximating the values of the derivative or second derivative at the sample points. These matrices have a banded structure, with nonzero elements found along or neighboring the diagonal elements:

$$D_h = \frac{1}{2h}\begin{bmatrix} & 1 & & & & \\ -1 & & 1 & & & \\ & -1 & & 1 & & \\ & & \ddots & & \ddots & \\ & & & -1 & & 1 \\ & & & & -1 & \end{bmatrix} \text{ and}$$

$$\Delta_h = \frac{1}{h^2}\begin{bmatrix} -2 & 1 & & & & \\ 1 & -2 & 1 & & & \\ & 1 & -2 & 1 & & \\ & & \ddots & & \ddots & \\ & & & 1 & -2 & 1 \\ & & & & 1 & -2 \end{bmatrix},$$

where 0-valued elements are omitted. $D_h u_h$ is a central difference approximation to the first derivative of the function u with samples placed h units apart and $\Delta_h u_h$ is a central difference approximation of the second derivative. The values for the ends of the interval are dependent on the initial and boundary conditions of the differential equation.

Differentiation can thus be seen as an operator that acts on a function and produces another function. For discretized functions, discretized differentiation operator is represented by a matrix. This is a consequence of differentiation being a linear operation in the continuous case.

By using the discretized representation $\Delta h$ for the second derivative, a semidiscrete version of the one-dimensional wave equation can be derived by substituting $u_k$ for u and substituting $\Delta_h u_h$ for $\nabla^2 u$:

$$u_h'' = c^2 \Delta_h u_h + f_h, \quad (8)$$

where $f_h$ denotes the values of the function $f$ at the sample points and primes denote differentiation with respect to time. The semidiscretized form of the wave equation is no longer a partial differential equation. Instead, it is an ordinary differential equation in N unknowns with the unknown vector $u_h$, whose elements are the values of the function u at the sample points $x_i$. This equation can be solved with any standard method for integrating differential equations with respect to time.

The one-dimensional difference approximations are easily extended to two or more dimensions. For instance, the gradient operator $\nabla$ in 3 dimensions is easily implemented with one-dimensional finite differences along each coordinate axis. The Laplacian operator can be expressed as:

$$\Delta u \Big|_{(ih,jh)} \approx \frac{u_h(i+1,j) - 2u_h(i,j) + u_h(i-1,j)}{h^2} + \frac{u_h(i,j+1) - 2u_h(i,j) + u_h(i,j-1)}{h^2} = \frac{u_h(i+1,j) + u_h(i-1,j) + u_h(i,j+1) + u_h(i,j-1) - 4u_h(i,j)}{h^2} \quad (9)$$

two dimensions, where the two-dimensional domain has been discretized into a regular grid of sample points, with the values of the function u at the sample points stored in a matrix $u_h$. The three-dimensional case is analogous. Writing the difference approximation from equation (9) into a matrix form can be achieved by first stacking the columns of $u_h$ into a long column vector, after which corresponding matrix expressions can be derived.

A fully discrete solution of the wave equation can be obtained by time stepping. The process is called integrating the differential equation. The semidiscretized equation can be expressed as $$\begin{cases} u_h'' = c^2 \Delta_h u_h + f_h, & x \in \Omega \text{(equation of motion)} \\ u_h(0,x) = u_h^0(x), & \text{(initial condition for } u_h\text{)} \\ u_h'(0,x) = v_h^0(x), & \text{(initial condition for } u_h'\text{)} \end{cases}$$

where $u_h^0$ and $v_h^0$ are predefined functions defined over the spatial discretization. This is a second-order system of ordinary differential equations in N unknowns.

Most integration methods apply to first-order differential equations. Higher-order problems can be transformed into first-order problems by introducing new variables. To transform the semidiscretized wave equation into a first-order system, a new variable $$v_h = \frac{du_h}{dt}$$

is defined so that equation (8) takes the form $$\begin{cases} \dfrac{dv_h}{dt} = c^2 \Delta_h u_h + f_h \\ \dfrac{du_h}{dt} = v_h \end{cases} \quad (10)$$

This has the effect of doubling the number of unknowns, since there are now two vectors of length N to solve for. Equations 10 can be further simplified by concatenating the vectors $u_h$ and $v_h$ into a new vector w:

$$\frac{dw}{dt} = Aw + g, \text{ with}$$

$$w = \begin{bmatrix} u_h \\ v_h \end{bmatrix}, g = \begin{bmatrix} 0 \\ f_h \end{bmatrix}, A = \begin{bmatrix} 0 & I \\ c^2 \Delta_h & 0 \end{bmatrix}, \text{ and } w(0) = \begin{bmatrix} u_h^0 \\ v_h^0 \end{bmatrix},$$

where each element of A, printed in bold, denotes a N×N submatrix and I denotes the identity matrix. The numerical solution of the above system is a discrete sequence $w^k$, k∈N, of vectors corresponding to values of the solution w at different time steps.

The processing of data collected from seismic-exploration operations represents some of the most computationally demanding data processing currently undertaken by commercial entities. The raw data can range from tens to hundreds of gigabytes to tens to hundreds of terabytes of data, or more. Many of the processing steps are computationally complicated, which, together with the large data sizes, compounds the computational expense of seismic-exploration-operation-generated data processing.

Many different types of processing steps are involved in generating images of subterranean features from raw seismic-exploration data. The initial data may be carefully checked for proper formatting and various types of systematic instrument and data-collection errors. Data may then be edited, which may include steps of systematic and instrumental error correction, demultiplexing, gain recovery, application of preliminary gain, wavelet shaping, vibroseis correction, vertical summation, resampling, and many other types of editing. Following editing, analysis may be undertaken to determine the values of various parameters, the analyses including geometry specification, deconvolution, statics determination, amplitude analysis, velocity analysis, application of normal moveout, muting and stacking, and filtering. Following parameter determination, main processing may ensue, involving deconvolution, statics determination, amplitude analysis, velocity analysis, normal moveout, meeting and stacking, gain adjustment, and filtering. At this point, certain of the boundary conditions, including a rough characterization of various subterranean features, including reflective-surface angles, dimensions and thicknesses of subsurface layers, fracturing, and other such subterranean features may be at least partially characterizable. Thus, an initial, if generally imprecise, solution of the wave equation can be obtained. Then, in the processing step referred to as "migration," the wave-equation solution may be refined by refining the characterization of the boundary conditions, including characterization of the subterranean features, including their dimensions, locations, material compositions, and other characterizations. The migration process generally involves the extrapolation of source and receiver wavefields. Following migration, additional steps of wavelet processing, attribute analysis, and inversion may be undertaken in order to create the final, best-resolution images of the subterranean environment of the domain volume in which the seismic-exploration operation was conducted.

Wave-equation-based seismic migration generally includes three steps: (1) forward extrapolation of the source wavefield, in depth or time; (2) backward extrapolation of the receiver wavefield, in depth or time; and (3) application of the suitable imaging condition of the extrapolated source and receiver wavefields to construct an image. In currently practiced seismic-migration methods, the source and receiver wavefield extrapolations may be carried out independently. The current document is directed to a new, more efficient, combined complex source-receiver-wavefield extrapolation process using a new wavefield extrapolation operator. Use of the new, combined, complex source-receiver wavefield extrapolation method may provide significant increases in computational efficiency including, in one implementation, a reduction of the computational overhead by a factor of 2.

Both time and depth extrapolation of a pressure wavefield is based on the acoustic-wave equation which, as discussed above, is a second-order linear partial differential equation. The efficient wavefield-extrapolation computational processing method discussed in this subsection can be used for extrapolating a lower-dimensional projection of a pressure wavefield to a higher-dimensional wavefield along any spatial or temporal dimension. As an example, the extrapolation computational processing method is discussed in the context of extrapolating a constant-depth slice to three-dimensional wavefield along the z spatial dimension, as illustrated in FIGS. 5A-C. However, extrapolation can also be carried out along either of the x and y spatial dimensions or along the temporal dimension t. For depth extrapolation, this second-order linear partial differential equation and can be equivalently expressed by a system of two first-order linear ordinary differential equations ("ODEs") as follows:

$$\frac{\partial}{\partial z}\begin{pmatrix} P \\ P_z \end{pmatrix} = \begin{pmatrix} 0 & 1 \\ G & 0 \end{pmatrix}\begin{pmatrix} P \\ P_z \end{pmatrix}, \quad (11)$$

where $$\frac{\partial}{\partial z}$$

is the first-order partial differential operator with respect to depth z; the two first-order linear ODEs are expressed in matrix-vector form; P is total pressure; $P_z$ is the normal derivative of pressure P; and G is an acoustic-wave-equation-related operator. The acoustic-wave-equation-related operator G can be expressed as:

$$G = \frac{1}{v^2}\frac{\partial}{\partial z} - \Delta xy, \quad (12)$$

where V(x,y,z) is the velocity of the pressure wave in the medium; and
$\Delta xy$ is the Laplace operator on space coordinates (x,y).
To solve equation (11) with given boundary conditions, the above matrix is normally reduced to a diagonal matrix by the eigenvalue decomposition method. Employing a "flat thin slab" model widely applied in depth extrapolation, the following matrix-form equations are derived from matrix-form equations (11) after applying the eigenvalue decomposition:

$$\frac{\partial}{\partial z}\begin{pmatrix} Pu \\ Pd \end{pmatrix} = \begin{pmatrix} \lambda & 0 \\ 0 & \lambda^* \end{pmatrix}\begin{pmatrix} Pu \\ Pd \end{pmatrix}, \quad (13)$$

where Pu and Pd denote up-going and down-going wavefields respectively, and are expressed in any of the space-time, space-angular-frequency, or wavenumber-angular-frequency domains. In this discussion, a wavenumber-angular-frequency expression and domain is implied when the representation and domain are not explicitly stated. $\lambda$ and $\lambda^*$ are two eigenvalues of the matrix in equation (11), also called "square root operators" for up-going and down-going waves, respectively. Mathematically, $\lambda$ and $\lambda^*$ are conjugate in the seismic-exploration context. In most currently practiced seismic-exploration data-processing and analysis methods, only a single equation of equation (13) is employed, and therefore only a single one-way operator is applied to a corresponding one-way wavefield. One-way methods are currently used because they are simple and efficient and because, in most seismic-exploration operations, only one physical quantity is measured, such as pressure in single-sensor-type marine exploration seismology. In the one-way methods, one of following decoupled one-way equations is generally applied individually:

$$\frac{\partial}{\partial z}(Pu) = \lambda \ Pu, \quad (14)$$

and $$\frac{\partial}{\partial z}(Pd) = \lambda^* \ Pd. \quad (15)$$

The solutions of one-way equations (14) and (15) with the Dirichlet boundary condition, for up-going and down-going waves, are well known as follows:

$$Pu(z)=LPu(z_0), \quad (16)$$

and $$Pd(z)=L^*Pd(z_0), \quad (17)$$

where $z_0$ and z, denote the depth of top and bottom interfaces of a "flat thin slab" extrapolation model embedded in an inhomogeneous horizontally layered media. When the slabs have identical thicknesses, the difference $\Delta z = z - z_0$ is the depth interval for each extrapolation step. One-way propagation operators L and L* in equations (16) and (17) are defined as follows:

$$L=\exp(\lambda \Delta z), \quad (18)$$

and $$L^*\exp(\lambda^* \Delta z), \quad (19)$$

where exp( ) denotes the exponential function, so that $\exp(x)=e^x$. For a constant velocity "flat thin slab" model, equations (17) and (18) can be exactly reduced to the well-known one-way propagation operators:

$$L=\exp(-jk_z\Delta z), \quad (20)$$

and $$L^*=\exp(jk_z\Delta z), \quad (21)$$

where $k_z$ is the vertical wavenumber; and j is imaginary number, or $\sqrt{-1}$. Note that operators $\lambda$ and $\lambda^*$ and L and L* in above equations (13)-(21) are conjugate pairs, independent of whether the velocity medium is constant or varied.

In two-sensor-type seismic-exploration operations, using, as one example, sensor pairs comprising a hydrophone and a geophone, the sampled wavefield can be straightforwardly partitioned into up-going and down-going wavefields, since the vertical fluid velocity is a signed quantity. This is also true when multi-component ocean-bottom cable are employed, the cables including four-component sensors comprising a hydrophone and a sensor for each of the three spatial components of particle velocity, or any of various other similar seismic-exploration instrumentation. In all such cases, initial boundary conditions for both pressure and the derivative of pressure with respect to depth, or equivalently, for both up-going and down-going waves, are known. In these cases, two-way full wavefield depth extrapolation is feasible and carried out by two conventional methods.

The first two-way-extrapolation method is straightforward. From equations (16) and (17):

$$P(z)=Pu(z)+Pd(z)=LPu(z_0)+L^*Pd(z_0), \quad (22)$$

and $$Q(z)=Pd(z)-Pu(z)=L^*Pd(z_0)-LPu(z_0), \quad (23)$$

where P is a summation of the up-going wavefield and down-going wavefield, a two-way full wavefield representation related to the total pressure; and Q is the difference between down-going and up-going wavefields, another two-way full wavefield representation related to the vertical component of particle velocity Vz and pressure derivative with respect to depth Pz as follows:

$$Q=(\rho\omega/k_z)Vz, \quad (24)$$

and $$Q=(-j/k_z)Pz, \quad (25)$$

where $\rho$ is volume density; and $\omega$ is angular frequency.

Based on equations (22) and (23), two-way full wavefields P and Q at depth z are obtained by a downward or upward extrapolation of both up-going and down-going waves at depth $z_0$ using corresponding one-way operators, followed by a summation and subtraction process.

The second method of two-way wavefield extrapolation is derived starting from the relationship between one-way wavefields Pu and Pz and two-way wavefields P and Q, as defined in equations (23) and (24) and by expressing $Pu(z_0)$ and $Pd(z_0)$ in terms of $P(z_0)$ and $Q(z_0)$:

$$Pu(z_0)=(½)[P(z_0)-Q(z_0)], \quad (26)$$

and $$Pd(z_0)=(½)[P(z_0)+Q(z_0)], \quad (27)$$

and by then substituting (26) and (27) into (22) and (23). The following formulas of the second method for extrapolating two-way full wavefield are obtained:

$$P(z)=P(z_0)(½)(L+L^*)+Q(z_0)(½)(L^*-L), \quad (28)$$

and $$Q(z)=P(z_0)(½)(L^*-L)+Q(z_0)(½)(L+L^*), \quad (29)$$

In contrast to terms L and L* in equations (17) and (17) denoting Green's functions for one-way wavefield propagation, terms ½ (L+L*) and ½ (L*−L) in equations (28) and

(29) are Green's functions for two-way fall wavefield propagation. Using the conjugate relationship that exists between L and L*, the following simplification is made for the two-way Green's functions:

$$Re(L)=Re(L^*)=(\tfrac{1}{2})(L+L^*), \tag{30}$$

and $$-j\,Im(L)=j\,Im(L^*)=(\tfrac{1}{2})(L^*-L), \tag{31}$$

where Re( ) and Im( ) denote respective real and imaginary parts of a complex variable or function, i.e. $L=Re(L)+j\,Im(L)$ and $L^*=Re(L^*)+j\,Im(L^*)$. Substituting (30) and (31) into (28) and (29) provides two simplified equations for two-way full wavefield extrapolation:

$$P(z)=P(z_0)Re(L)-jQ(z_0)Im(L), \tag{32}$$

and $$Q(z)=-jP(z_0)Im(L)+Q(z_0)Re(L).$$

Equations (32) and (33) are equivalent to equations (28) and (29). In both cases, only one of one-way operators L and L* is now involved, and only a multiplication between a complex vector representing the two-way wavefield and a real vector representing the real and imaginary parts of the one-way operator is involved in equations (32) and (33).

The above two methods for two-way full-wavefield extrapolation, based on equations (22) and (23), and equations (32) and (33), respectively, are equivalent, not only in accuracy but also in efficiency. In order to complete a two-way full wavefield extrapolation for each step, from depth $z_0$ to z, by the first method of equations (22) and (23), each one-way complex wavefield, $Pu(z_0)$ and $Pd(z_0)$, is multiplied by a complex one-way extrapolation operator, L or L*, and the two complex products are added to produce complex wavefield P(z) and subtracted to produce complex wavefield Q(z). Thus, for each propagation step, with n equal to the number of sample points in a two-dimensional, constant-depth slice of the complex wavefield, 2n complex-number multiplications and 2n complex additions are carried out, considering subtraction to be computationally equivalent to addition.

In a typical migration process based on the above-discussed propagation operators, the source wavefield may be defined at depth $z_0$ by $s(x,y,z_0,t)$. The source wavefield may be either a physical source wavefield or a generalized source wavefield, such as areal secondary sources, down-going surface-related and internal multiples, and other such wavefields, and the receiver wavefield at depth $z_0$ may be defined by $r(x,y,z_0,t)$, which may be either a physical measurement or a generated receiver wavefield, such as decomposed primary and multiple up-going waves. The counterparts of the source wavefield s and receiver wavefield r may be defined, in the wavenumber-angular-frequency domain, as follows:

$$R=F(r) \tag{34}$$

and $$S=F(s), \tag{35}$$

where the notation F( ) denotes a Fourier transform, which transforms the space-time domain functions s and r to their equivalent wavenumber-angular-frequency-domain counterparts (S and R).

To extrapolate source and receiver wavefields using the propagation operators described in equations (16) and (17), the down-going wave Pd can be replaced by the downwardly propagating source term S and the up-going wave Pu can be replaced by the upwardly propagating receiver term R in the equations:

$$R(z)=LR(z_0) \tag{36}$$

and $$S(z)=L^*S(z_0), \tag{37}$$

where R(z) and R($z_0$) are receiver wavefields at depths z and $z_0$; and

S(z) and S($z_0$) are source wavefields at depths z and $z_0$. The matrix-vector form of equations (36) and (37) is:

$$\begin{pmatrix} R(z) \\ S(z) \end{pmatrix} = A_1 \begin{pmatrix} R(z_0) \\ S(z_0) \end{pmatrix}, \tag{38}$$

where $$A_1 = \begin{pmatrix} L & 0 \\ 0 & L^* \end{pmatrix}$$

is the propagation operator widely used in seismic-exploration practice for extrapolating source and receiver wavefields. When an imaging condition is applied to R(z) and S(z), the migration at depth z may be completed as:

$$I(z)=[S(z),R(z)], \tag{39}$$

where I(z) is the migration result at depth z; and the notation denotes an abstract algebraic dual-element operation which, in the current context, can be either an operation of multiplication, cross-correlation, or deconvolution, depending on the specific imaging condition that is applied.

Thus, migration is carried out in a three-step operation described by equations (38) and (39), where equation (38) implies two separate steps for propagation of the receiver and source wavefields and equation (39) generates the migration result, or image element at depth z.

Next, two new propagation operators that are equivalent (belong to the same conjugate class) to the above-discussed propagation operator $A_1$ are discussed. First, a new propagation operator $A_2$ can be straightforwardly algebraically derived. First, define two new functions p and q, linear manifolds of s and r:

$$p(z)=s(z)+r(z) \tag{40}$$

and $$q(z)=s(z)-r(z). \tag{41}$$

Correspondingly, denote P and Q, linear manifolds of R and S, as follows:

$$P(z)=S(z)+R(z) \tag{42}$$

and $$Q(z)=s(z)-R(z). \tag{43}$$

Using equation (38), P and Q can alternatively be expressed as:

$$P(z)=L^*S(z_0)+LR(z_0) \tag{44}$$

and $$Q(z)=L^*S(z_0)-LR(z_0). \tag{45}$$

The definitions of P and Q given in equations (42) and (43), $S(z_0)$ and $R(z_0)$ can be expressed as linear combinations of $P(z_0)$ and $Q(z_0)$, as follows:

$$R(z_0) = \frac{1}{2}[P(z_0) - Q(z_0)] \tag{46}$$

and $$S(z_0) = \frac{1}{2}[P(z_0) + Q(z_0)]. \tag{47}$$

Substituting these expressions for $R(z_0)$ and $S(z_0)$ into equations (44) and (45), the following expressions are obtained:

$$P(z) = P(z_0)\frac{1}{2}(L+L^*) + Q(z_0)\frac{1}{2}(L^*-L) \tag{48}$$

and $$Q(z) = P(z_0)\frac{1}{2}(L^*-L) + Q(z_0)\frac{1}{2}(L+L^*). \tag{49}$$

Propagation terms $\frac{1}{2}(L+L^*)$ and $\frac{1}{2}(L^*-L)$ in equations (27) and (28) are Green's functions for two-way wavefield propagation. Because:

$$L = \text{Re}(L) + j\,\text{Im}(L) \tag{50}$$

and $$L^* = \text{Re}(L^*) + j\,\text{Im}(L^*), \tag{51}$$

the two-way Green's functions can be alternatively expressed as:

$$\text{Re}(L) = \text{Re}(L^*) = \frac{1}{2}(L+L^*) \tag{52}$$

and $$j\,\text{Im}(L) = j\,\text{Im}(L^*) = \frac{1}{2}(L^*-L), \tag{53}$$

where Re( ) and Im( ) denote the real and imaginary parts of a complex operator, respectively, and both are real. In other words, Im(a+jb)=b. Substituting equations (52) and (53) into equations (48) and (49) produces the following two equations:

$$P(z) = P(z_0)\text{Re}(L) - jQ(z_0)\text{Im}(L) \tag{54}$$

and $$Q(z) = jP(z_0)\text{Im}(L) + Q(z_0)\text{Re}(L), \tag{55}$$

which can be expressed in matrix-vector form as:

$$\begin{pmatrix} P(z) \\ Q(z) \end{pmatrix} = A_2 \begin{pmatrix} P(z_0) \\ Q(z_0) \end{pmatrix}, \tag{56}$$

where $$A_2 = \begin{pmatrix} \text{Re}(L) & -j\,\text{Im}(L) \\ -j\,\text{Im}(L) & \text{Re}(L) \end{pmatrix}$$

is a new propagation operator for extrapolating source and receiver wave fields. Equations (54)-(56) are equivalent to, but different from, equations (36)-(38). The new propagation operator $A_2$ acts on a combined source receiver wavefield while $A_1$ acts on source and receiver wavefields separately.

The second new propagation operator $A_3$ is next derived. Like propagation operator $A_2$, new propagation operator $A_3$ acts on combined source-and-receiver wavefields. First, complex wave fields u and v can be defined in the space-time domain as:

$$u = p + jq \tag{57}$$

and $$v = p - jq, \tag{58}$$

where p and q, as defined in equations (40) and (41), are linear combinations of the source-and-receiver wavefields s and r. Note that complex wavefields u and v are conjugate because both s and r and p and q are real. Equations (35) and (36) can be expressed in the wavenumber-angular-frequency domain as follows:

$$U = F(u) = P + jQ \tag{59}$$

and $$V = F(v) = P - jQ, \tag{60}$$

where U and V are Fourier transforms of u and v, respectively. U and V are, in general, not conjugated, since both P and Q in equations (42) and (43) are complex. Substitution of equations (54) and (55) into equations (59) and (60) produces:

$$U(z) = U(z_0)\text{Re}(L) + V(z_0)\text{Im}(L) \tag{61}$$

and $$V(z) = -U(z_0)\text{Im}(L) + V(z_0)\text{Re}(L), \tag{62}$$

where $U(z_0)$ and $V(z_0)$ denote values of U and V at depth $z_0$, respectively. The matrix-vector form of equations (61) and (62) is:

$$\begin{pmatrix} U(z) \\ V(z) \end{pmatrix} = A_3 \begin{pmatrix} U(z_0) \\ V(z_0) \end{pmatrix}, \tag{63}$$

where $$A_3 = \begin{pmatrix} \text{Re}(L) & \text{Im}(L) \\ -\text{Im}(L) & \text{Re}(L) \end{pmatrix}$$

is another new propagation operator for extrapolating source and receiver wavefields. Equations (61)-(62) are equivalent to equations (36)-(38) and (54)-(56), but are unique and robust. The propagation operator $A_3$ acts on a combined source-and-receiver wavefield and may also be more efficient than either of propagation operators $A_1$ and $A_2$.

Equivalent expressions for the three propagation operators $A_1$, $A_2$, and $A_3$ can be obtained by algebraic manipulations as:

$$A_1 = \text{Re}(L)\begin{pmatrix} 1 & 0 \\ 0 & 1 \end{pmatrix} - \text{Im}(L)\begin{pmatrix} 1 & 0 \\ 0 & -1 \end{pmatrix}, \tag{64}$$

$$A_2 = \text{Re}(L)\begin{pmatrix} 1 & 0 \\ 0 & 1 \end{pmatrix} - \text{Im}(L)\begin{pmatrix} 0 & 1 \\ 1 & 0 \end{pmatrix}, \tag{65}$$

and $$A_3 = \text{Re}(L)\begin{pmatrix} 1 & 0 \\ 0 & 1 \end{pmatrix} - \text{Im}(L)\begin{pmatrix} 0 & -i \\ i & 0 \end{pmatrix}. \tag{66}$$

The matrices at the ends of the above expressions for propagation operators $A_1$, $A_2$, and $A_3$ are well-known Pauli matrices. Therefore, the above expressions can be unified as:

$$A_i = \text{Re}(L)E - \text{Im}(L)\sigma_i, \tag{67}$$

where $$E = \begin{pmatrix} 1 & 0 \\ 0 & 1 \end{pmatrix};$$

and $\sigma_i$ denotes a Pauli matrix, with $i \in (1, 2, 3)$.

The three propagation operators belong to the same conjugate class. In other words, they can transformed from one to another by a similarity transform. A similarity-transform-based approach can be used to derive one propagation operator from another. For example, $A_3$ can be derived from $A_2$ as follows. Propagation operator $A_2$ can be expressed in similarity form B by:

$$A_2 = M^{-1}BM \tag{68}$$

and $$B = MA_2M^{-1}, \tag{69}$$

where M and its inverse $M^{-1}$ are similarity-transform-related matrices. Matrix M and its inverse $M^{-1}$ can be defined with the following constant coefficients:

$$M = \begin{pmatrix} 1 & j \\ 1 & -j \end{pmatrix}, \tag{70}$$

and $$M^{-1}(-1/2j)\begin{pmatrix} -j & -j \\ -1 & 1 \end{pmatrix}. \tag{71}$$

Inserting equation (68) into equation (56), equation (56) can be rewritten as:

$$\begin{pmatrix} P(z) \\ Q(z) \end{pmatrix} = M^{-1}BM \begin{pmatrix} P(z_0) \\ Q(z_0) \end{pmatrix}. \tag{72}$$

Defining functions U and V as linear combinations of functions P and Q:

$$\begin{pmatrix} U \\ V \end{pmatrix} = M \begin{pmatrix} P \\ Q \end{pmatrix}. \tag{73}$$

In substituting equation (70) and (71) into equations (72) and (73), equation (72) can be rewritten as:

$$\begin{pmatrix} U(z) \\ V(z) \end{pmatrix} = B \begin{pmatrix} U(z_0) \\ Z(z_0) \end{pmatrix}, \tag{74}$$

where B is the new operator to be derived. Based on equation (56) and equations (69)-(71), B can be derived by matrix-vector multiplication as follows:

$$B = MA_2M^{-1} = \begin{pmatrix} R_e(L) & I_m(L) \\ -I_m(L) & R_e(L) \end{pmatrix}. \tag{75}$$

As can be seen, the matrix equations described by (74) and (75) are the same as those described by equation (63). Therefore, operator B is equal to operator $A_3$.

The three propagation operators $A_i$ all belong to the same group SU(2) and, as discussed above, are equivalent. However, they are associated with different computational efficiencies. Propagation operator $A_3$ can be used to carry out both source and receiver wavefield extrapolation in one step, as expressed by either equation (61) or (62). The desired solution p(z) and q(z), and therefore s(z) and r(z), can be obtained by separation of real and imaginary parts from a single complex wavefield, either u or v in the original space-time domain. Because only one equation, either (61) or (62) is applied for both source and receiver wavefield extrapolation for each depth step, only two multiplications between a complex vector and a real vector and one summation of complex vectors are needed. However, using propagation operators $A_1$ or $A_2$, twice the number of multiplications of a complex vector and real vector and twice the number of summations of complex vectors are needed. Thus, use of propagation operator $A_3$ is twice as computationally efficient as use of either propagation operators $A_1$ or $A_2$. Therefore, use of propagation operator $A_3$ for the extrapolation portion of migration, the most computationally complex portion of migration, can significantly increase the efficiency of the migration process.

It should again be noted that the above discussion of complex, combined source-and-receiver wavefield extrapolation uses abstract notation, referred to as "equations," which represent computations carried out on generally very large data sets. For example, applying an operator to function representing a wavefield involves applying a computational operation to each of thousands, millions, billions, or more data values represented by the function. Thus, while mathematical notation is used, in the above discussion, the notation represents computational operations applied to enormous data sets, the computational operations controlled by computer instructions stored in physical data-storage devices, such as electronic memories, electromagnetic-mechanical mass storage devices, electro-optico-mechanical mass-storage devices, and other such physical data-storage devices, and executed by hardware processors. The data sets and results of operations applied to data sets are also stored in physical data-storage devices, such as electronic memories, electromagnetic-mechanical mass storage devices, electro-optico-mechanical mass-storage devices, and other such physical data-storage devices.

Figure 8A:
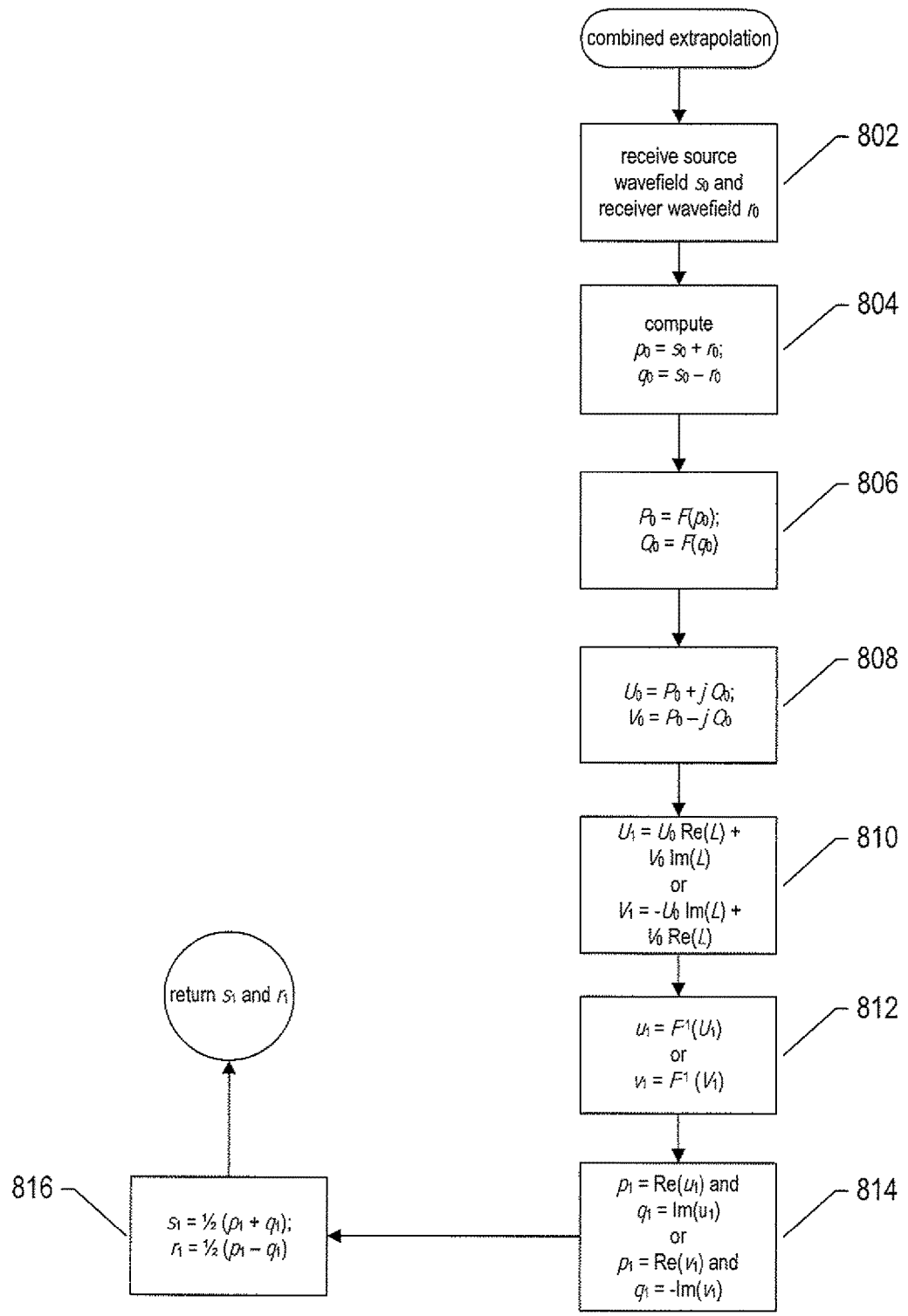
FIGS. 8A-B provide a control-flow-diagram-based illustration of a combined-wavefield-extrapolation method and a migration process that employs the combined-wavefield-extrapolation method.
Figure 8B:
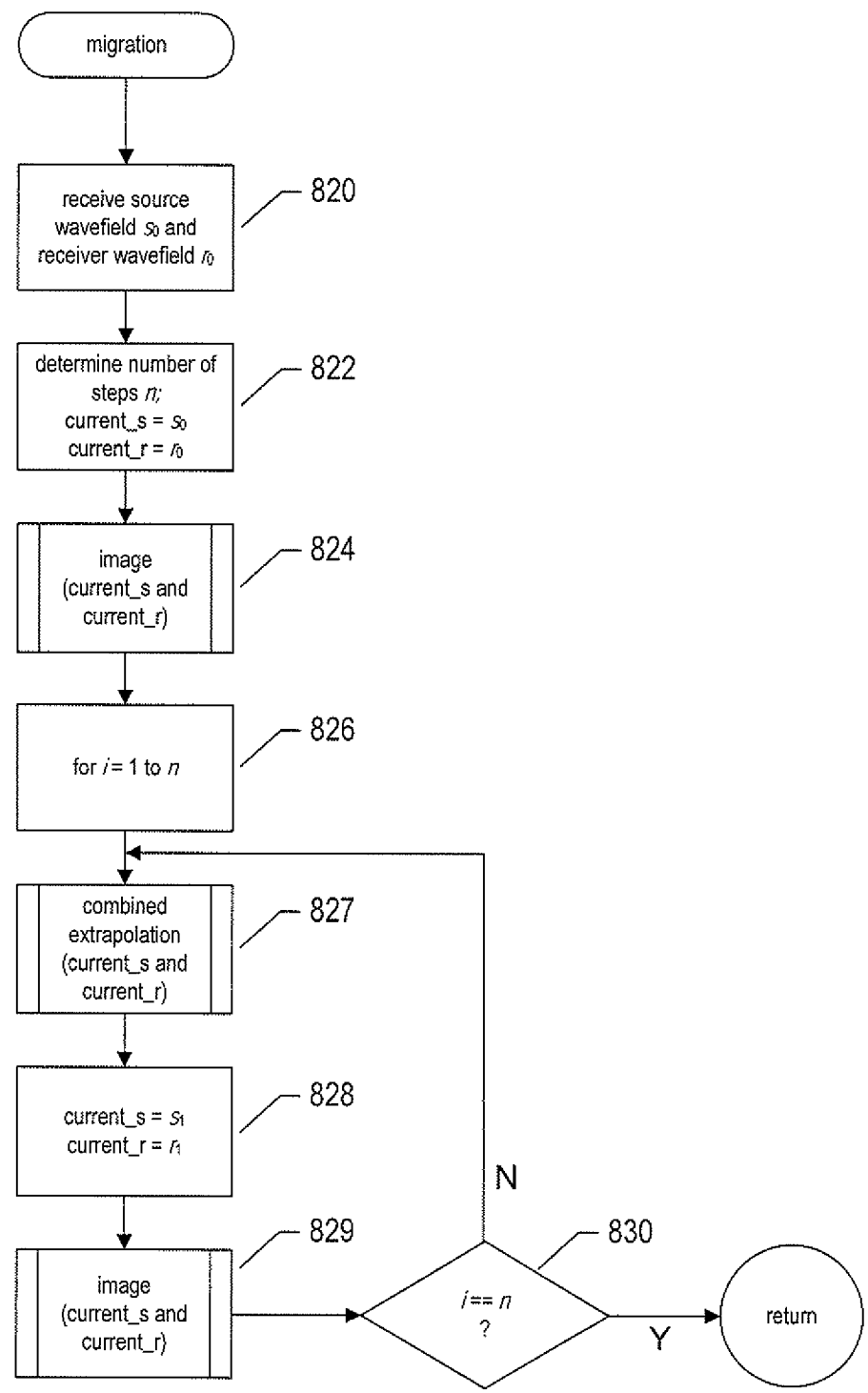

FIGS. 8A-B provide a control-flow-diagram-based illustration of a combined-wavefield-extrapolation method and a migration process that employs the combined-wavefield-extrapolation method. FIG. 8A uses slightly different notation than used in the previously provided equations. FIG. 8A shows a control-flow diagram for a combined-wavefield-extrapolation routine that carries out one extrapolation step, from input source and receiver wavefields $s_0$ and $r_0$ to a next source wavefield and receiver wavefield $s_1$ and $r_1$. In step 802, the combined-extrapolation routine receives a source wavefield $s_0$ and receiver wavefield $r_0$. Next, in step 804, the combined-extrapolation routine computes $p_0$ and $q_0$ using the above-provided expressions for p and q (equations (40) and (41)). In step 806, the combined-extrapolation routine Fourier transforms $p_0$ and $q_0$ to obtain the wavenumber-angular-frequency wavefields $P_0$ and $Q_0$. In step 808, the combined-extrapolation routine computes $U_0$ and $V_0$ from $P_0$ and $Q_0$ (equations 59) and (60)). In step 810, the $A_3$ propagation operator is used to propagate either $U_0$ to $U_1$ or $V_0$ to V. Then, in step 812, either $U_1$ is reverse Fourier transformed to $u_1$ or $V_1$ is reverse Fourier transformed to $v_1$. In step 814, $p_1$ and $q_1$ are obtained from either $u_1$ or Finally, in step 816, the next-step wavefields $s_1$ and $r_1$ are computed from $p_1$ and $q_1$. These are returned as the results of the single-step combined wavefield extrapolation.

FIG. 8B illustrates a control-flow diagram of a migration process. In step 820, the migration process receives source wavefields $s_0$ and receiver wavefield $r_0$. In step 822, the routine "migration" determines a number of steps n to carry out. In addition, the variables current_s and current_r are set to $s_0$ and $r_0$, respectively. In step 824, an image routine is called to generate the zero-level image. Image generation is discussed above, with reference to equation (39). Then, in the for-loop of steps 826-830, iterative wavefield extrapolation and imaging are carried out in a stepwise fashion. In step 827, the combined-extrapolation routine, discussed above with reference to FIG. 8A, is used to propagate the current source and receiver wavefields to the next levels. In step 828, the local variables current_s and current_r are updated to the results returned from the call to the combined-extrapolation routine in step 827. Then, in step 829, an imaging routine is called to generate a current-level image from the current wavefields.

Figure 9:
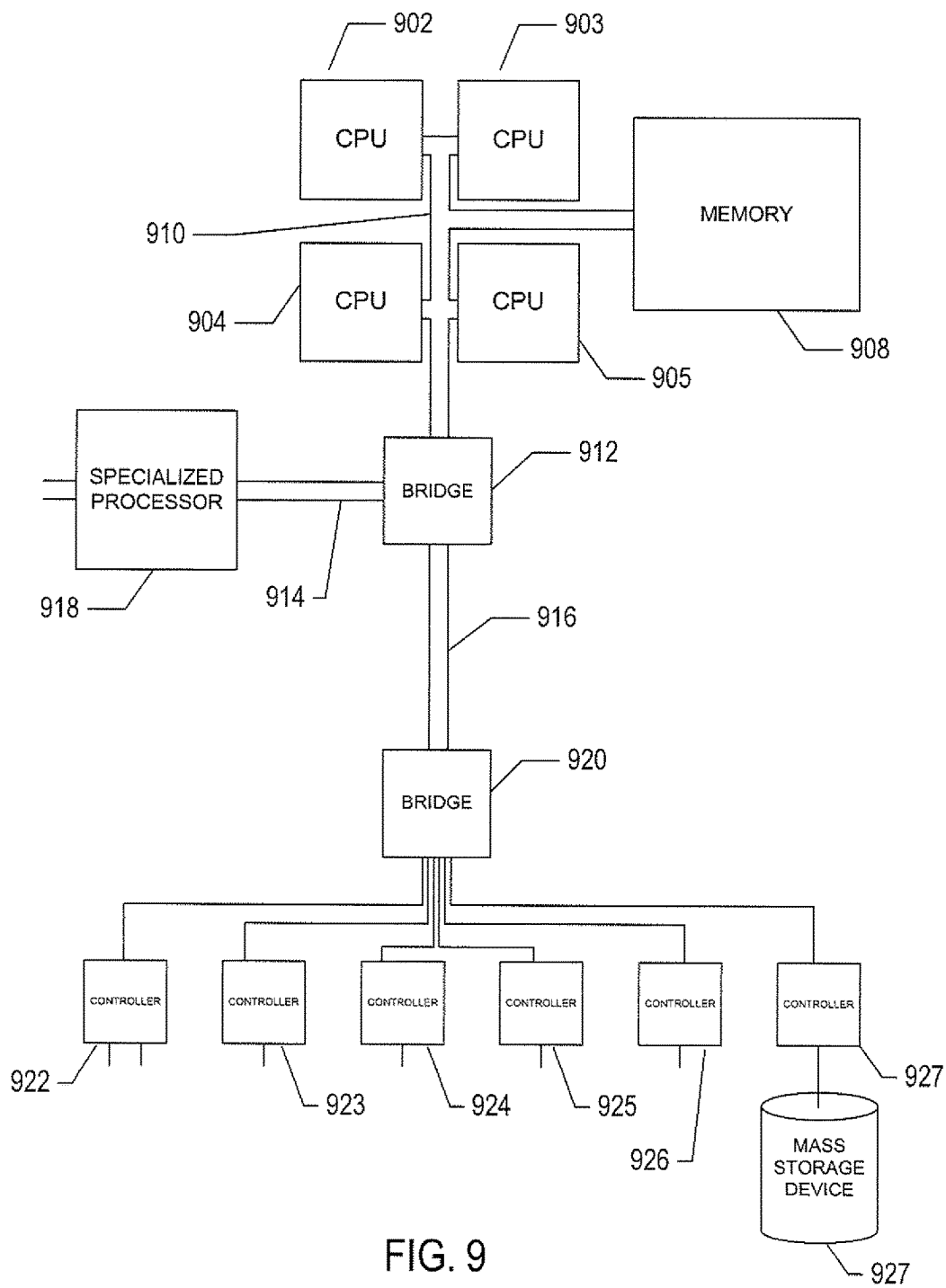
FIG. 9 shows one illustrative example of a generalized computer system that executes an efficient two-way wavefield extrapolation and therefore represents a seismic-exploration data-analysis system to which portions of the current document are directed.

FIG. 9 shows one illustrative example of a generalized computer system that executes an efficient two-way wavefield extrapolation and therefore represents a seismic-exploration data-analysis system to which portions of the current document are directed. FIG. 9 provides a general architectural diagram for various types of computers and other processor-controlled devices. The high-level architectural diagram may describe a modern computer system, such as the PC in FIG. 2, in which scanned-document-image-rendering programs and optical-character-recognition programs are stored in mass-storage devices for transfer to electronic memory and execution by one or more processors to transform the computer system into a specialized optical-character-recognition system. The computer system contains one or multiple central processing units ("CPUs") 902-905, one or more electronic memories 908 interconnected with the CPUs by a CPU/memory-subsystem bus 910 or multiple busses, a first bridge 912 that interconnects the CPU/memory-subsystem bus 910 with additional busses 914 and 916, or other types of high-speed interconnection media, including multiple, high-speed serial interconnects. These busses or serial interconnections, in turn, connect the CPUs and memory with specialized processors, such as a graphics processor 918, and with one or more additional bridges 920, which are interconnected with high-speed serial links or with multiple controllers 922-927, such as controller 927, that provide access to various different types of mass-storage devices 928, electronic displays, input devices, and other such components, subcomponents, and computational resources.

In accordance with an embodiment of this disclosure, a geophysical data product indicative of certain properties of the subsurface rock may be produced from the detected energy. The geophysical data product may include processed seismic-exploration data and may be stored on a non-transitory, tangible computer-readable medium. The geophysical data product may be produced offshore (i.e. by equipment on a vessel) or onshore (i.e. at a facility on land) either within the United States or in another country. If the geophysical data product is produced offshore or in another country, it may be imported onshore to a facility in the United States. Once onshore in the United States, geophysical analysis may be performed on the data product.

The systems and methods discussed herein may be used to improve the efficiency—in terms of speed, costs, and accuracy—of data processing for geophysical surveys. Such improvements may allow for quicker, cheaper, and more accurate prediction of locations of subsurface hydrocarbon formations. Likewise, improved predictions of hydrocarbons in subsurface formations may result in substantial cost savings in the recovery and production of hydrocarbons.

Although the present invention has been described in terms of particular embodiments, it is not intended that the invention be limited to these embodiments. Modifications within the spirit of the invention will be apparent to those skilled in the art. For example, any of a variety of different specific implementations of combined wavefield extrapolation and migration processes that use the combined wavefield extrapolation can be obtained by varying any of many different design and implementation parameters, including source language, modular organization, data structures, control structures, and other such design and implementation parameters. As discussed above, the combined wavefield extrapolation method can be used to extrapolate a wave field along a depth, time, or other type of dimension in any of various different seismic-exploration-data-processing methods and steps.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. In a technological method of imaging subterranean geological structures that includes:
    accessing sensor data generated during one or more seismic survey passes;
    at least partially characterizing one or more boundary conditions based on the sensor data, including a rough characterization of one or more subterranean features, to generate an initial solution of a wave equation;
    the specific improvement comprising:
        refining the initial solution of the wave equation by iteratively receiving or generating a first and a second derived, second-domain, complex, combined source-and-receiver wavefield at a first level in a first survey dimension, having a common second domain, and applying, to the first and the second derived, second-domain, complex, combined source-and-receiver wavefields at the first level, a propagation operator that propagates one of the first and the second second-domain, complex, combined source-and-receiver wavefields to a corresponding derived, second-domain, complex, combined source-and-receiver wavefield at a next, second level in the first survey dimension; and
        constructing an image of the subterranean features based on the iteratively receiving or generating, thereby reducing compute resources used to construct the image.

2. The method of claim 1 wherein the second domain is selected from among a set of domains that include:
a space-time domain;
a space-angular-frequency domain; and
a wavenumber-angular-frequency domain.

3. The method of claim 2, further comprising applying a transform operation to the second-domain, complex, combined source-and-receiver wavefield at the next, second level to generate a corresponding first-domain, complex, combined source-and-receiver wavefield at the next, second level.

4. The method of claim 3 wherein the transform operation is an inverse Fourier transform.

5. The method of claim 2, further comprising:
generating a first, first-domain, real, combined source-and-receiver wavefield by selecting a real component of the first-domain, complex, combined source-and-receiver wavefield at the next, second level; and
generating a second, first-domain, real, combined source-and-receiver wavefield by selecting an imaginary component of the first-domain, complex, combined source-and-receiver wavefield at the next, second level.

6. The method of claim 5, further comprising:
generating a first, first-domain, real, combined source-and-receiver wavefield at the next, second level by selecting a real component of the first-domain, complex, combined source-and-receiver wavefield at the next, second level; and
generating a second, first-domain, real, combined source-and-receiver wavefield at the next, second level by selecting an imaginary component of the first-domain, complex, combined source-and-receiver wavefield at the next, second level.

7. The method of claim 6, further comprising:
generating a first-domain source wavefield at the next, second level by combining, in a fifth combination, the first, first-domain, real, combined source-and-receiver wavefield at the next, second level and the second, first-domain, real, combined source-and-receiver wavefield; and
generating a first-domain receiver wavefield at the next, second level by combining, in a sixth combination, the first, first-domain, real, combined source-and-receiver wavefield at the next, second level and the second, first-domain, real, combined source-and-receiver wavefield.

8. The method of claim 7
wherein the fifth combination is an addition-based combination and the sixth combination is a subtraction-based combination; or
wherein the fifth combination is a subtraction-based combination and the sixth combination is an addition-based combination.

9. The method of claim 7, wherein the first survey dimension is depth or time.

10. The method of claim 1 wherein the generating the first and the second derived, second-domain, complex, combined source-and-receiver wavefield at the first level from a first-domain source wavefield at the first level and a first-domain receiver wavefield at the first level, each having a common first domain includes:
generating a first first-domain, real, combined source-and-receiver wavefield by a first combination of the first-domain source wavefield at the first level and the first-domain receiver wavefield at the first level;
generating a second first-domain, real, combined source-and-receiver wavefield by a second combination of the first-domain source wavefield at the first level and the first-domain receiver wavefield at the first level;
generating a first second-domain, intermediate, complex, combined source-and-receiver wavefield from the first first-domain, real, combined source-and-receiver wavefield by a forward transform operation;
generating a second second-domain, intermediate, complex, combined source-and-receiver wavefield from the second first-domain, real, combined source-and-receiver wavefield by a forward transform operation;
combining, in a third combination, the first and second second-domain, intermediate, complex, combined source-and-receiver wavefields to produce a first derived, second-domain, complex, combined source-and-receiver wavefield; and
combining, in a fourth combination, the first and second second-domain, intermediate, complex, combined source-and-receiver wavefields to produce a second derived, second-domain, complex, combined source-and-receiver wavefield.

11. The method of claim 10 wherein the second domain is selected from among a set of domains that include
a space-time domain,
a space-angular-frequency domain, and
a wavenumber-angular-frequency domain; and
wherein the second domain is a different domain that the first domain.

12. The method of claim 10 wherein the first and third combinations are addition-based combinations and the second and fourth combinations are subtraction-based combinations; or wherein the first and third combinations are subtraction-based combinations and the second and fourth combinations are addition-based combinations.

13. The method of claim 10 wherein a wavefield in the first domain is converted to an equivalent wavefield in the second domain by the forward transform operation; and wherein a wavefield in the second domain is converted to an equivalent wavefield in the first domain by an inverse transform operation.

14. The method of claim 13 wherein the forward transform operation is a Fourier transform operation and the inverse transform operation is an inverse Fourier transform operation.

15. The method of claim 10 wherein the combining, in the third combination, the first and second second-domain, intermediate, complex, combined source-and-receiver wavefields to produce the first, derived, second-domain, complex, combined source-and-receiver wavefield includes:
selecting one of the first and second second-domain, intermediate, complex, combined source-and-receiver wavefields as a real component of the first, derived, second-domain, complex, combined source-and-receiver wavefield; and
selecting the other of the first and second second-domain, intermediate, complex, combined source-and-receiver wavefields as an imaginary component of the first, derived, second-domain, complex, combined source-and-receiver wavefield with a first sign.

16. The method of claim 15 wherein the combining, in the fourth combination, the first and second second-domain, intermediate, complex, combined source-and-receiver wavefields to produce the second, derived, second-domain, complex, combined source-and-receiver wavefield includes:
selecting the one of the first and second second-domain, intermediate, complex, combined source-and-receiver wavefields as a real component of the second, derived, second-domain, complex, combined source-and-receiver wavefield; and selecting the other of the first and second second-domain, intermediate, complex, combined source-and-receiver wavefields as an imaginary component of the second, derived, second-domain, complex, combined source-and-receiver wavefield with a second sign.

17. The method of claim 1 wherein the applying, to the first and the second derived, second-domain, complex, combined source-and-receiver wavefields at the first level, the propagation operator that propagates one of the first and the second second-domain, complex, combined source-and-receiver wavefields to the corresponding derived, second-domain, complex, combined source-and-receiver wavefield at the next, second level includes:

applying a first two-way wavefield propagation operator to one of a real component and complex component of one of the first and the second derived, second-domain, complex, combined source-and-receiver wavefields at the first level to generate a first next-level component;

applying a second two-way wavefield propagation operator to the other of the real component and complex component of the other of the first and the second derived, second-domain, complex, combined source-and-receiver wavefields at the first level to generate a second next-level component; and combining the first next-level component and the second next-level component to produce the second-domain, complex, combined source-and-receiver wavefield at the next, second level.

18. The method of claim 17 wherein first two-way wavefield propagation operator and the second two-way wavefield propagation operator are Green functions.

19. A method for generating an image of subterranean geological structures, comprising:

accessing, by a computing system, sensor data generated during one or more seismic survey passes;

characterizing, by the computing system, one or more boundary conditions based on the sensor data, including a rough characterization of one or more subterranean features, to generate an initial solution of a wave equation;

refining, by the computing system, the initial solution of the wave equation by iteratively receiving or generating a first and a second derived, second-domain, complex, combined source-and-receiver wavefield at a first level in depth or time, having a common second domain, and applying, to the first and the second derived, second-domain, complex, combined source-and-receiver wavefields at the first level, a propagation operator that propagates one of the first and the second second-domain, complex, combined source-and-receiver wavefields to a corresponding derived, second-domain, complex, combined source-and-receiver wavefield at a next, second level in depth or time; and constructing, by the computing system, an image of the subterranean features based on the iteratively receiving or generating, thereby reducing compute resources used to construct the image.

20. The method of claim 19, further comprising:

generating, from the derived, second-domain, complex, combined source-and-receiver wavefield at a next, second level, a first-domain source wavefield at the next, second level and a first-domain receiver wavefield at the next, second level.

21. A non-transitory computer-readable medium having instructions stored thereon that are executable by a computing system to perform operations comprising:

accessing sensor data generated during one or more seismic survey passes;

characterizing one or more boundary conditions based on the sensor data, including a rough characterization of one or more subterranean features, to generate an initial solution of a wave equation;

refining the initial solution of the wave equation by iteratively receiving or generating a first and a second derived, second-domain, complex, combined source-and-receiver wavefield at a first level in depth or time, having a common second domain, and applying, to the first and the second derived, second-domain, complex, combined source-and-receiver wavefields at the first level, a propagation operator that propagates one of the first and the second second-domain, complex, combined source-and-receiver wavefields to a corresponding derived, second-domain, complex, combined source-and-receiver wavefield at a next, second level in depth or time; and constructing an image of the subterranean features based on the iteratively receiving or generating.

* * * * *